United States Patent
Evans et al.

(10) Patent No.: US 7,610,339 B2
(45) Date of Patent: Oct. 27, 2009

(54) INTERNET-BASED COMMUNICATIONS VERIFICATION SYSTEM

(75) Inventors: Glynis Winfield Evans, Surrey (CA); Vicki Kathleen Auerbach, Victoria (CA)

(73) Assignee: Datawitness Online Ltd., Richmond (CA)

( * ) Notice: Subject to any disclaimer, the term of this patent is extended or adjusted under 35 U.S.C. 154(b) by 516 days.

(21) Appl. No.: 10/379,758

(22) Filed: Mar. 4, 2003

(65) Prior Publication Data

US 2003/0212891 A1    Nov. 13, 2003

Related U.S. Application Data

(60) Provisional application No. 60/361,668, filed on Mar. 4, 2002.

(51) Int. Cl.
    *G06F 15/16*      (2006.01)
(52) U.S. Cl. .................................................. 709/206
(58) Field of Classification Search .................. 709/206
See application file for complete search history.

(56) References Cited

U.S. PATENT DOCUMENTS

| | | | | |
|---|---|---|---|---|
| 6,016,478 A | * | 1/2000 | Zhang et al. .................... | 705/9 |
| 6,145,079 A | * | 11/2000 | Mitty et al. .................... | 713/170 |
| 6,182,219 B1 | * | 1/2001 | Feldbau et al. ................. | 713/176 |
| 6,327,611 B1 | * | 12/2001 | Everingham ................... | 709/206 |
| 6,640,301 B1 | * | 10/2003 | Ng ................................. | 713/156 |
| 6,931,592 B1 | * | 8/2005 | Ramaley et al. .............. | 715/209 |
| 7,020,688 B2 | * | 3/2006 | Sykes, Jr. ...................... | 709/206 |
| 7,047,248 B1 | * | 5/2006 | Tycast ........................... | 707/102 |
| 7,051,370 B2 | * | 5/2006 | Wakino ......................... | 726/30 |
| 2002/0007453 A1 | * | 1/2002 | Nemovicher ................. | 713/155 |
| 2002/0029187 A1 | * | 3/2002 | Meehan et al. ............... | 705/37 |
| 2002/0144154 A1 | * | 10/2002 | Tomkow ....................... | 713/201 |
| 2003/0028495 A1 | * | 2/2003 | Pallante ........................ | 705/78 |
| 2003/0090531 A1 | * | 5/2003 | Wong et al. .................. | 347/1 |

* cited by examiner

*Primary Examiner*—Kenny S Lin
*Assistant Examiner*—Julian Chang
(74) *Attorney, Agent, or Firm*—Fasken Martineau DuMoulin LLP

(57) ABSTRACT

A system is provided for the verified exchange of messages through an electronic message exchange system and for the verified archiving of such messages. More particularly, the message format of an initiating message, and optionally of subsequent messages in the exchange of messages, is structured to command the recipient of the message to accept or to express a lack of acceptance of the content of the transmitted message, or to reply in some other structured manner. The entirety of an exchange of messages between two (or more) parties, including the acceptance or non-acceptance of content at any stage of the exchange, is recorded in the secure archives of an authenticator, which facility can verify the authenticity, sequence, date, time and content of and parties to any exchange of messages sent within the inventive system, including acceptance or non-acceptance of content of a given message at any stage of the exchange.

20 Claims, 39 Drawing Sheets

INTERNET-BASED COMMUNICATIONS VERIFICATION SYSTEM

CROSS-REFERENCE TO RELATED APPLICATION

This application claims priority to U.S. Provisional Patent Application Ser. No. 60/361,668 filed on Mar. 4, 2002.

FIELD OF THE INVENTION

This invention relates to a system (methodology and supporting infrastructure) for the verified exchange of messages through an electronic message exchange system, including via the internet, and to the verified archiving of such messages. The system includes methodology permitting and preferably requiring the recipient of a message to accept its content or to initiate a dialogue that permits the parties to the initial message to reach a verified understanding of any agreement reached between them in connection therewith, and includes a third-party archiving and means for verification of the original message and the subsequent exchange of messages between the communicating parties. In this specification, internet-based apparatus and methodology is usually described by way of example, but the inventive technology can be used in or with other systems, such as intranet networks.

BACKGROUND OF THE INVENTION

Internet-based party authentication and data verification systems are known per se, particularly for use in the context of financial transactions, such as credit-card purchases or buy/sell contracts, whereby the parties to the transaction are able (in some cases) to verify the authenticity of one another, to provide verified data (e.g. price, credit-card information) to one another, and to provide security of the data transferred. Others working with Internet-based transactional systems have developed systems that allow for the use of standardized data forms and secure signatures. In most if not all such instances, the verified and secure data are limited to selected fields in a suitable transaction database, and are limited in many instances to either signatures (or electronic equivalent) or numerical data.

In other contexts, electronic messages between two or more communicating parties that are intended to lead to an agreement of some sort between them (or at least to an understanding that an agreement has not been reached) may be encrypted or otherwise secured in some suitable fashion by the parties, but remain susceptible to tampering by the parties themselves. For example, a party sophisticated in computer technology can generate for a stored message an apparent date and time that are not the true date and time on which the message was sent. Or such party can concoct a fictitious message that purports to have been sent to or received from the other party, and store the fictitious message with an attributed date and time that suit the wrongful purposes of the party who has concocted the message.

Further, conventional e-mail message exchanges lack a structure that compels the recipient to concur with the content of the message or to initiate a counterprocedure that could lead to modification or retraction of the content, or to a superseding text. There are e-mail communication systems that prioritize messages and that invite the recipient to acknowledge their receipt, etc., but there is a need for a system that is structured to compel or strongly induce the recipient of a message not only to provide a response but also to provide in such response an express agreement or lack of agreement with the content of a transmitted message.

SUMMARY OF THE INVENTION

A preferred embodiment of the e-mail-related system of the present invention, having both method and apparatus aspects, capable of being implemented and practiced on the Internet, includes the following characteristics:

1. The message format of an initiating message, and optionally of subsequent messages in an exchange of messages, is structured to command the recipient of the message to accept or to express a lack of acceptance of the content of the transmitted message.
2. The entirety of an exchange of messages between two parties (modifiable to permit the exchange to occur between more than two parties), including the acceptance or non-acceptance of content at any stage of the exchange, is recorded in the secure archives of an independent message storage facility (the "authenticator"), which facility can verify the authenticity, sequence, date, time and content of any exchange of messages sent within the inventive system, including the acceptance or non-acceptance of content of a given message at any stage of the exchange.

Either of the foregoing two characteristics of the preferred embodiment of the invention may be used independently of the other, and each is considered to be novel. However, there is a synergy from the use of both of these aspects of the invention working together. The structured communication aspect facilitates care in creation of a document and in the response to be made to a submitted document. The fact that the history of the communication exchange will be permanently of record in the archives of the authenticator tends to reinforce human willingness that care and attention will be paid to the content of the submitted document and the response to be made to it. The archived history itself is rendered more orderly and usable (both currently by the parties and later if the archives are used as evidence of the exchange of communications) by reason of the structure imposed on the exchange of communications.

In particular, the following useful characteristics or advantages of a preferred embodiment of a system according to the invention exist:

1. There is no limit on the nature of the subject-matter of the exchange of communications. It could vary from "Are you free to go to the Globe Theatre with me next Tuesday to see Pygmalion?" to "I'll ship you 200 luxury automobiles to arrive FOB Helsinki on or before Jun. 24, 2002 in exchange for your certified bank draft for $US 468,000."
2. The structure imposed on the communications encourages discipline in the expression, organization and conduct of the communications exchange, but the imposed structure itself can be varied. It can be varied by document type and by selection of permitted response, for example.
3. The communications invariably pass through the authenticator's own communication channels or a communication channel selected or approved by the authenticator (with, of course, the option available to the parties to communicate with one another outside the 'official' communication channels established by the authenticator). This characteristic has two important consequences, viz: (i) The parties are aware that their exchange of messages is being recorded and preserved; this tends to reinforce care and discipline in the communication process; and (ii) all such communications are readily captured by the authenticator; the communications exchange occurs within the authenticator's system so that each passing message can readily be captured and stored by the authenticator.

4. The parties need not themselves exert special care to record and preserve the exchange of important communications; this happens automatically; each of the parties can rely upon the authenticator's archived record as evidence of what transpired.

5. Because the system can be completely automated except for data entry by the parties, the authenticator's expense to operate the system, once up and running, can be low, and the cost of the service to the parties using it can be kept within manageable bounds.

6. Connectivity to useful associated systems, such as internet or intranet networks or peripheral apparatus, can be readily accomplished, since the stored data is conveniently stored in accessible databases and can be copied to or retrieved by any other facility having authorized access to the authenticator's system.

7. Note that if an individual initiator acting as an employee of a subscriber is using the system according to the invention, the on-the-job performance of the employee in a negotiation environment as reflected in the documents generated by the employee and by recipients' responses to those documents can be monitored by the employer throughout the negotiation process and afterwards.

Note that for the commercial success of the system, the authenticator would presumably have to establish credibility for its service in terms of independence, technical reliability, security, longevity, etc. To some extent this credibility may, for any start-up authenticator, be established by creating a dual archive of all recorded communications data, one such archive maintained by the authenticator, and the other maintained by a known and respected document storage service provider, preferably providing such service for both digital and analog electronic records. Once the authenticator's reputation is well established, the second component of the dual service may optionally be eliminated.

In one exemplary network-based implementation of a system according to the invention, the initiator of an intended exchange of messages selects an initiating electronic document from a set of standard forms (e.g., a contract, a general document, a letter of engagement, or an undertaking). The initiator customizes the document to the facts of the situation, including the e-mail address of the intended recipient of the message (who, when replying to the message, becomes the "responder") and sends the message to and stores it electronically on an independent authenticator's secure server—a web server, if the implementation of the invention is via the internet. The document may be accompanied by a cover message or may include within its format such cover message. Once accessed by the initiator, the authenticator automatically, manages the exchange of data between the initiator and the responder until the parties stop communicating or elect to terminate the authenticator's management of the exchange.

In the foregoing exemplary implementation, upon receipt of an initiating message, the authenticator then sends the stored e-mail message, including a URL link to whatever document has been created by the initiator, to the designated recipient in a format requiring the recipient to view and respond to the message. Pursuant to the format, the recipient, acting as responder, is given the option to accept, decline or request clarification of the initiating message. The authenticator automatically communicates to the initiator by e-mail (i) the fact of viewing of the message by the responder and (ii) the responder's elected response. The initiator can at any time check the status of all messages sent, and learn whether the recipient has viewed any prior message sent to the responder by the initiator, whether or not the responder has responded. In this exemplary implementation of the invention, all messages, including any standard documents, their date and time of dispatch, the date and time of their viewing by the recipients, and the date, time and election by the responders of the elected responses made to the contents of the messages, are stored by the authenticator and are copied to the recipients and retrievable by the initiator only (unless the recipients are also subscribers, as discussed infra) for later copying or use, including, for example, copying for legal evidentiary purposes. Other particulars may be stored as deemed desirable, such as the date and time of receipt by the authenticator of the initiating message.

The methodology summarized above is not restricted to two-party exchanges, but clearly is extendible to multi-party exchanges of communications. The addition of parties does not require any change in the basic methodology. While in this specification, two-party exchanges will frequently be discussed by way of example, it should be understood that the invention extends mutatis mutandis to multi-party messages. In some instances, such as the giving of an undertaking that is personal to the responder, it may be desirable to limit the number of recipients to one.

The system according to the invention may be used to facilitate negotiations intended to lead to a concluded contract or the like. At each stage of the exchange, the acceptance or non-acceptance of the content of the immediately preceding message and all earlier messages can be reviewed, and the fact of viewing of a message by the recipient can also be reviewed, along with stored particulars relating to each such act. In one embodiment of the invention, such review may be limited to review by the initiator, who has paid the authenticator a subscriber fee and/or message fee for the authenticator's service, unless the responder is also a subscriber to the authenticator's service, in which case the responder would have equal viewing rights. Equally, if the responder is not a subscriber, the responder will not be able to avail itself of the capability to invoke the authenticator's message formatting to compel or induce the initiator to elect one of a limited number of responses to the responder's message. The fact that the messages and the nature of the response to messages and other pertinent particulars are stored with an independent authenticator may help constrain the parties to productive message exchanges that facilitate an orderly progress of negotiations.

In yet further embodiments of the invention, connectivity is provided to electronic message distribution facilities or electronic digital/analog data storage facilities or other useful peripheral facilities. Connectivity may also be provided to Internet-based accounting systems for establishing and notification or collection of fees incurred for the use of the authenticator's system.

In some preferred embodiments of the inventive system, the authenticator is provided with party authentication means, at least vis-a-vis prospective message initiators, to ensure upon log-in, that at least the initiating party using the system is who it claims to be. In some embodiments, the authenticator is provided with connectivity to one or more other verifiers to enable those other verifiers to authenticate one or more parties to the communication. For example, if members of a professional body such as an organization of lawyers are subscribers to an Internet-based lawyer authentication system such as the Juricert system operating in Canada, connectivity between that system and the authenticator may enable the authenticator to verify the identity of a lawyer designated as the initiator of a message or responder thereto, without having the lawyer as a direct subscriber to the authenticator's service.

Some preferred embodiments of the inventive system enable the authenticator to distinguish between categories of subscribers. For example, subscribers could be personal users, business users or legal users. All subscribers might, for example, be required to pay to the authenticator an initial registration fee, a monthly maintenance fee, and a per-communication or per-quantum data entry fee. Fees may also apply to optional services, including file retrieval on CD-ROM, and possibly witness fees. Fees may be varied by subscriber category. In some cases, subscriber access to the authenticator's service may be required to be limited to certain authorized employees, such as the e-mail communications administrator of a corporation.

The system according to the invention is adaptable to the needs of various individuals and enterprises who wish to achieve one or both of the following objectives: (a) a verified record of the history of an exchange of communications (which in the simplest case would be the electronic transmission of a document followed by the acceptance by the responder of the content of the document); and (b) in such exchange, methodology for facilitating the reaching of an understanding. That understanding on an interim message-by-message basis is typically one of the following three discrete types: (i) the responder accepts or consents to the content of the initiator's message or document; (ii) the responder rejects the content; or (iii) the responder seeks clarification of the initiator's message. Note also that the recipient conceivably may view the message but may elect not to respond to the message, and in that event, no understanding is reached. In appropriate cases, the responder in rejecting the content might counterpropose substitute content.

In this specification, for convenience, an Internet implementation of the inventive system will for the most part be discussed. However, the system can be adapted for use with any telecommunications network permitting an exchange of messages of the type discussed herein. Note that it is not essential that data in a message be printed or displayed as a printable message on a screen; the system according to the invention could be adapted to other manifestations of data, such as identifiable symbols, drawings or illustrations, or even voice mail.

SUMMARY OF DIAGRAMS

FIGS. 5 to 24 are screen capture diagrams each showing a computer monitor screen display of a representative e-mail message or webpage; each of these diagrams illustrates what a viewer may see on-screen at various stages of the processing or transmission of data pursuant to a preferred embodiment of the invention. The particular diagrams are contrived, being derived from an in-house prototype system developed by Datawitness Online Ltd. and expected to be available for initial commercial use shortly after the filing of the present provisional patent application. The diagrams are intended to be illustrative of message and web page displays that would be suitable for use in the implementation of a preferred embodiment of the invention.

Figure 5:
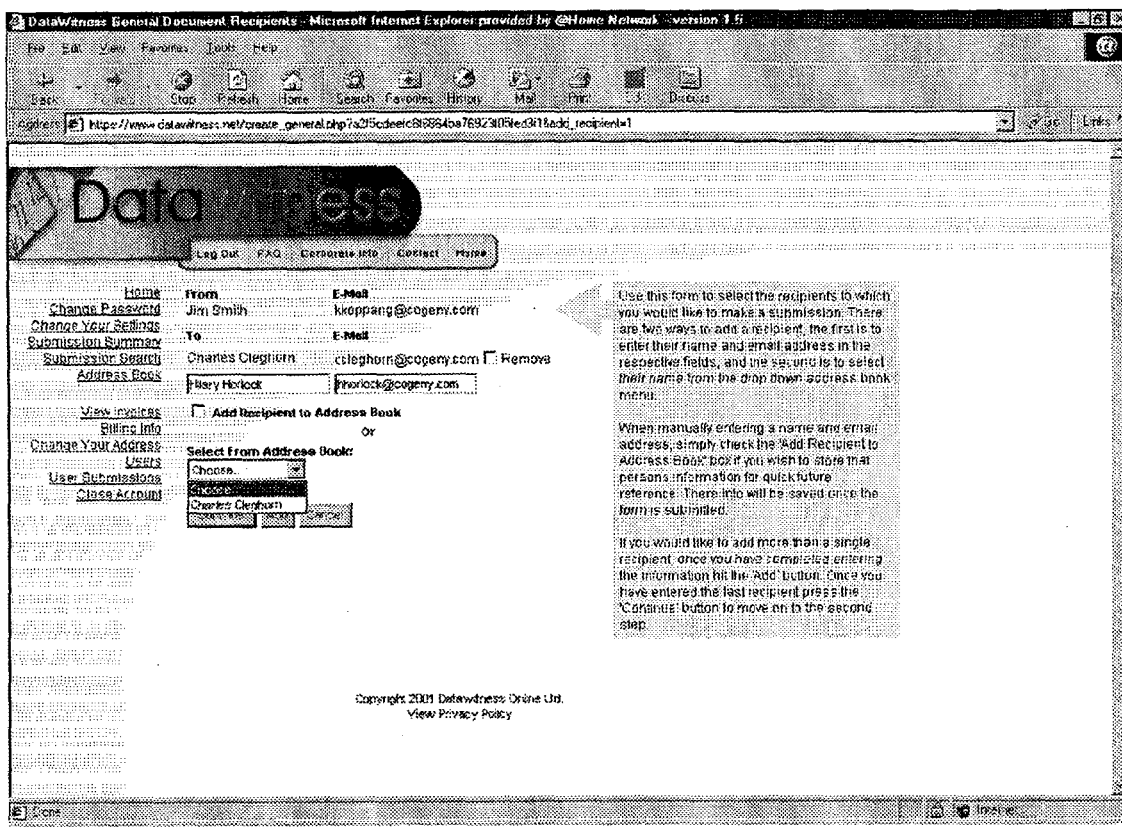

FIG. 5 is a screen capture diagram of the initial web page seen by an initiator in creating a document to be submitted.

Figure 6:
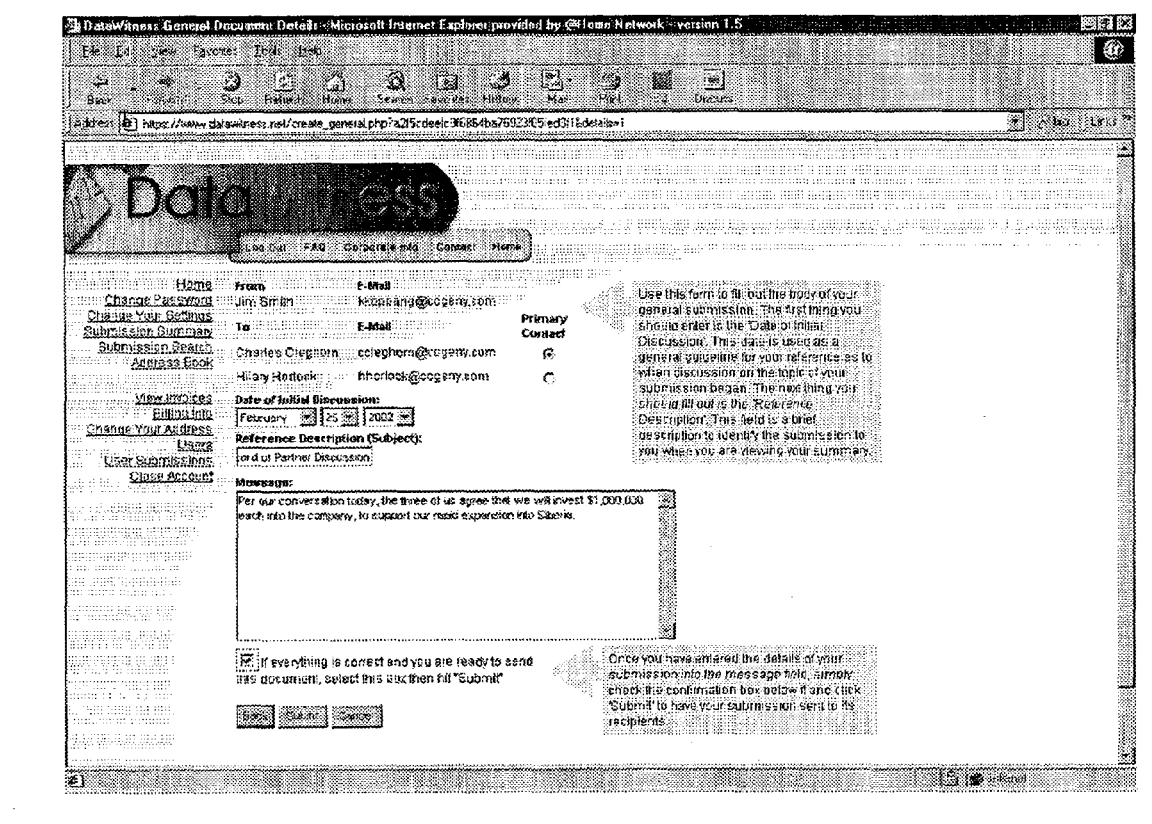

FIG. 6 is a screen capture diagram of the second web page seen by an initiator in creating a document to be submitted.

Figure 7:
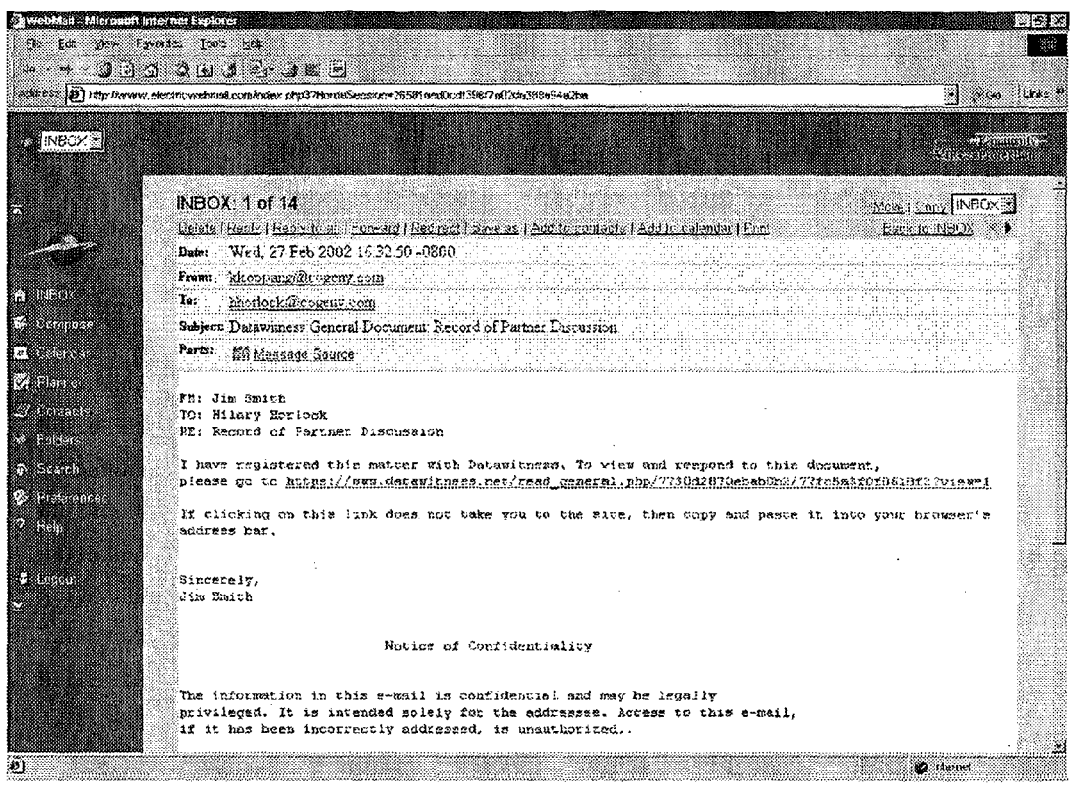

FIG. 7 is a screen capture diagram of a representative e-mail message sent to the recipient of a submitted document, which message includes a link to the document as stored in the authenticator's database.

Figure 8:
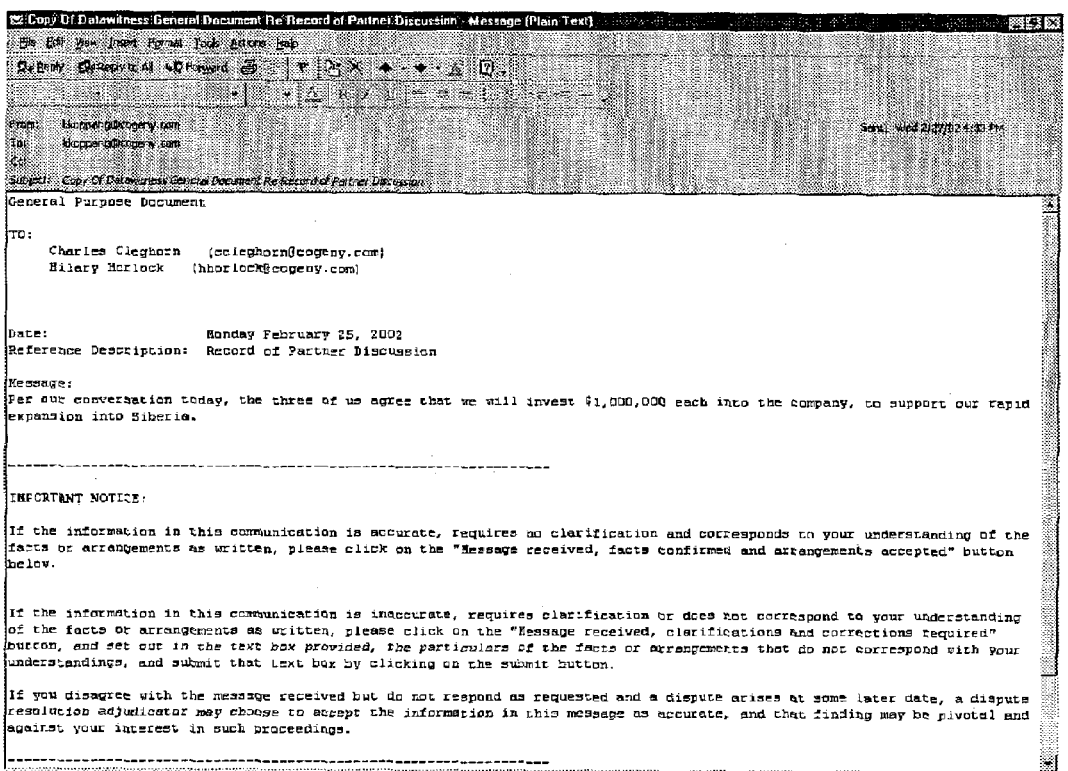

FIG. 8 is a screen capture diagram of a representative e-mail message sent to the initiator of a submitted document, which message includes the text of the document submitted.

Figure 9:
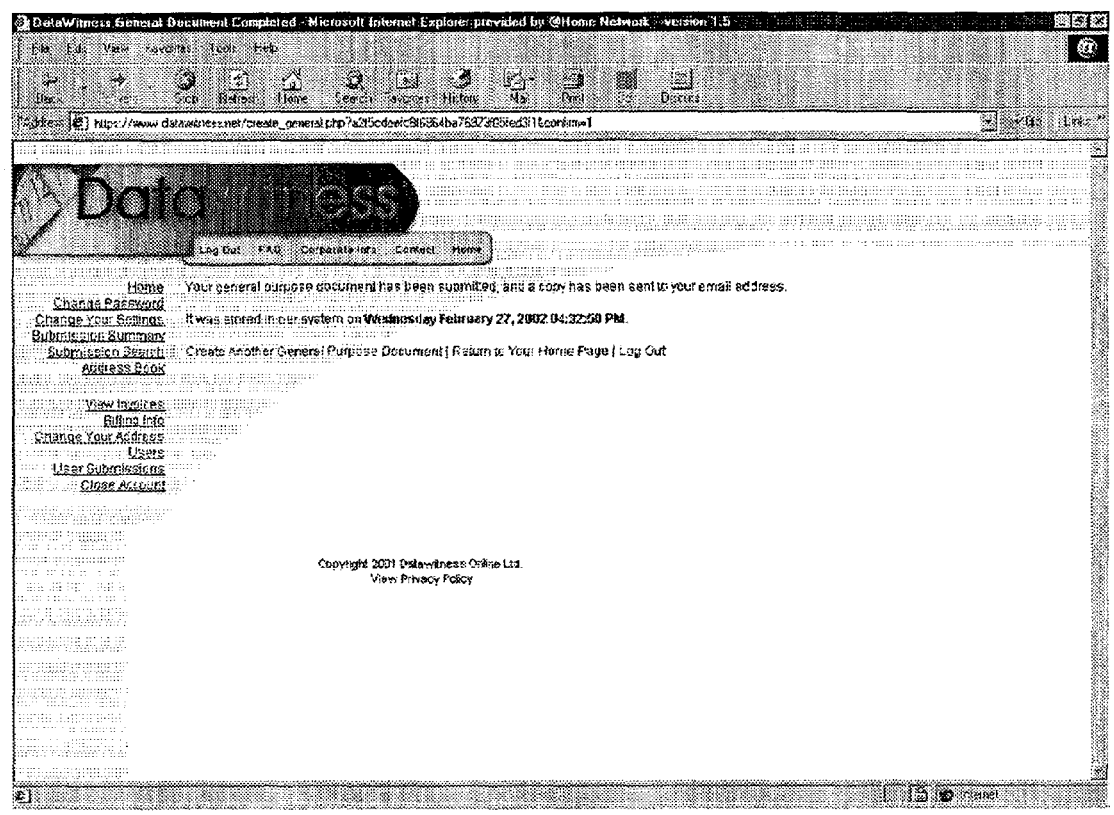

FIG. 9 is a screen capture diagram of a submission confirmation web page for viewing by the initiator of the document submitted.

Figure 10:
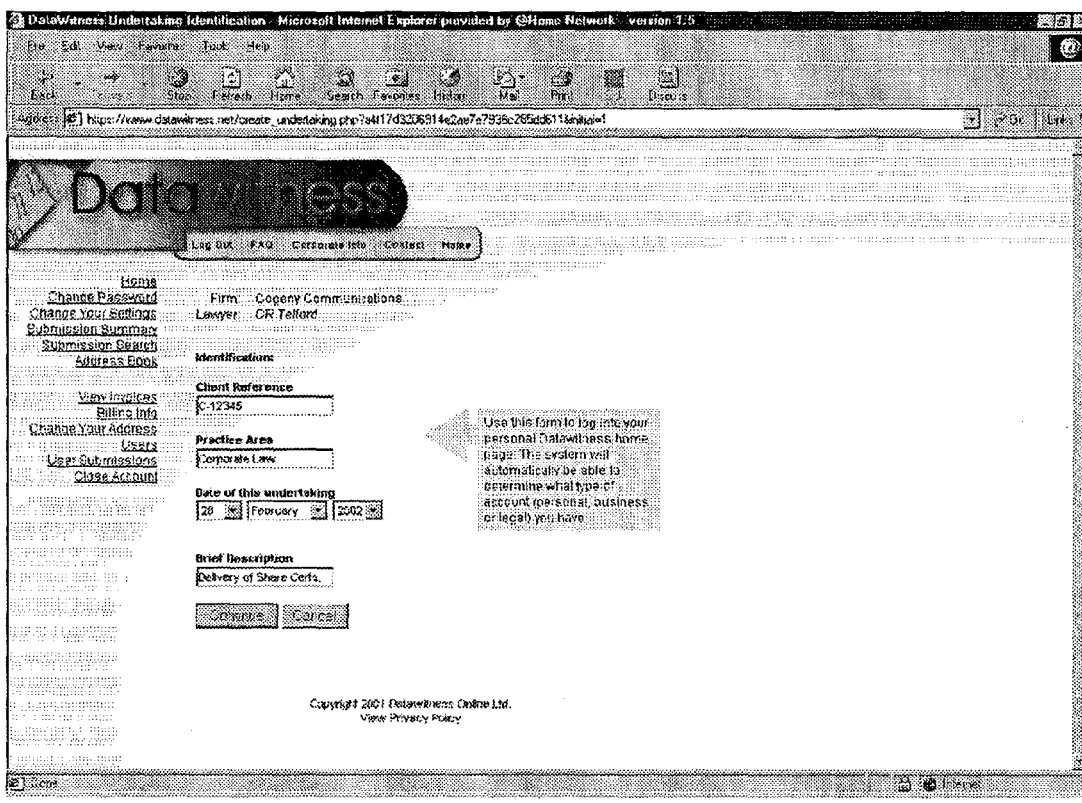

FIG. 10 is a screen capture diagram of the first screen of a submission web page suitable for creating an undertaking to be sought from a recipient.

Figure 11:
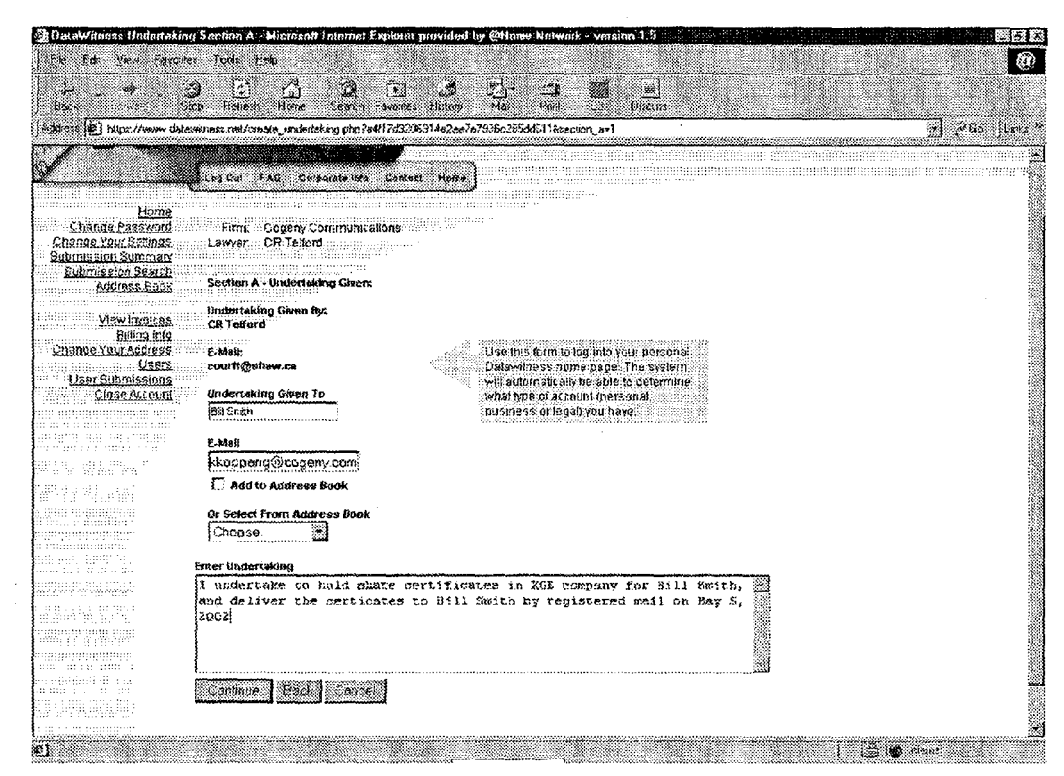

FIG. 11 is a screen capture diagram of the second screen of a submission web page suitable for creating an undertaking to be sought from a recipient.

Figure 12:
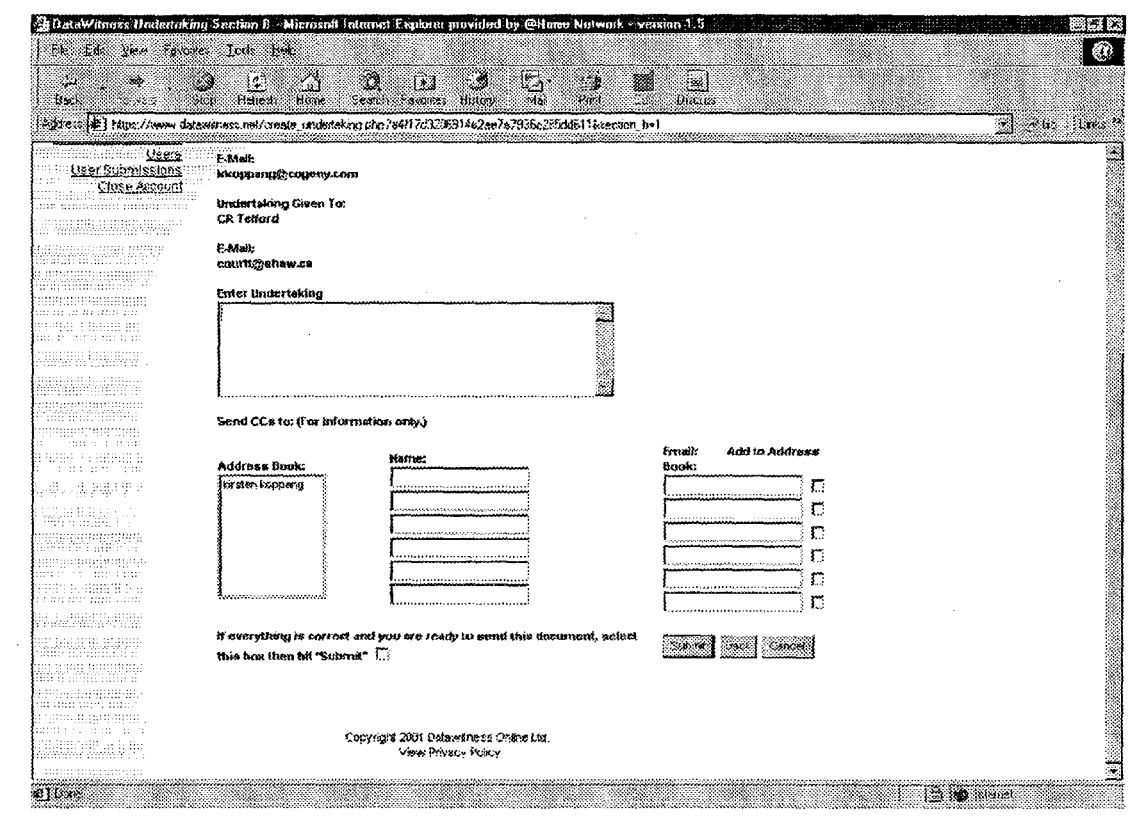

FIG. 12 is a screen capture diagram of a modified view of the second screen of a submission web page suitable for creating an undertaking to be sought from a recipient, that is displayed when the initiator selects the address book option for identifying the recipient.

Figure 13:
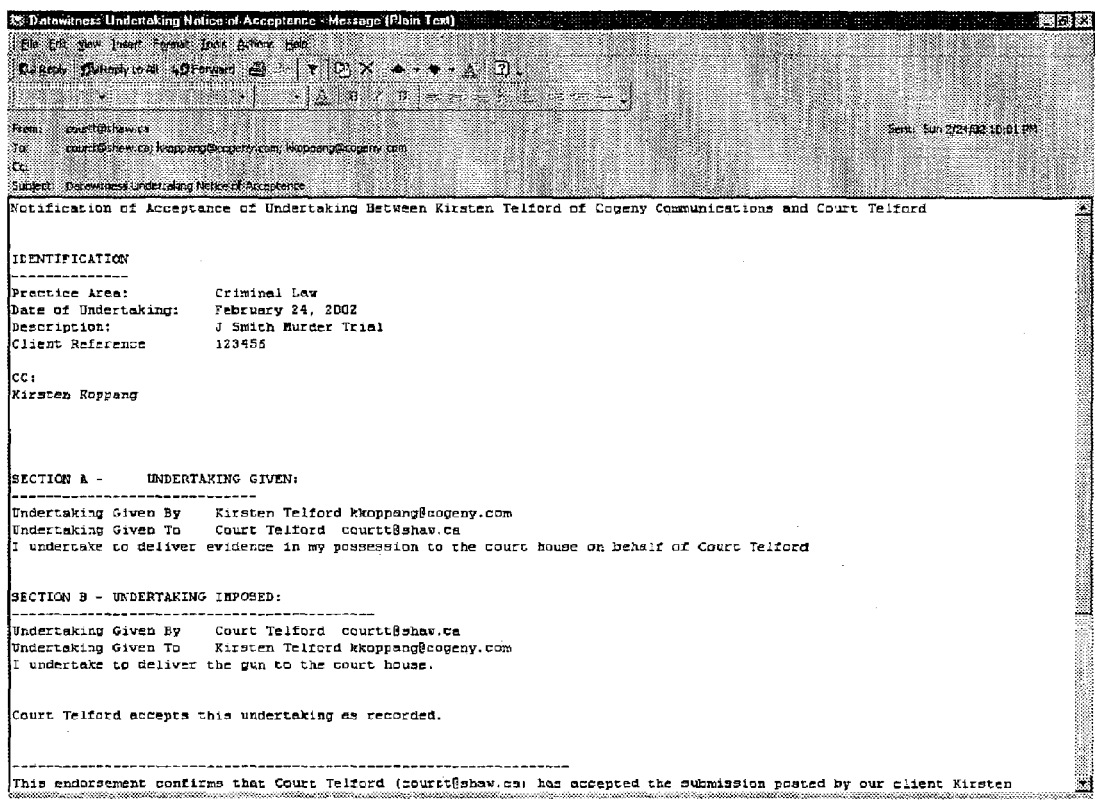

FIG. 13 is a screen capture diagram of a notification of acceptance of a representative exchange of undertakings.

Figure 14:
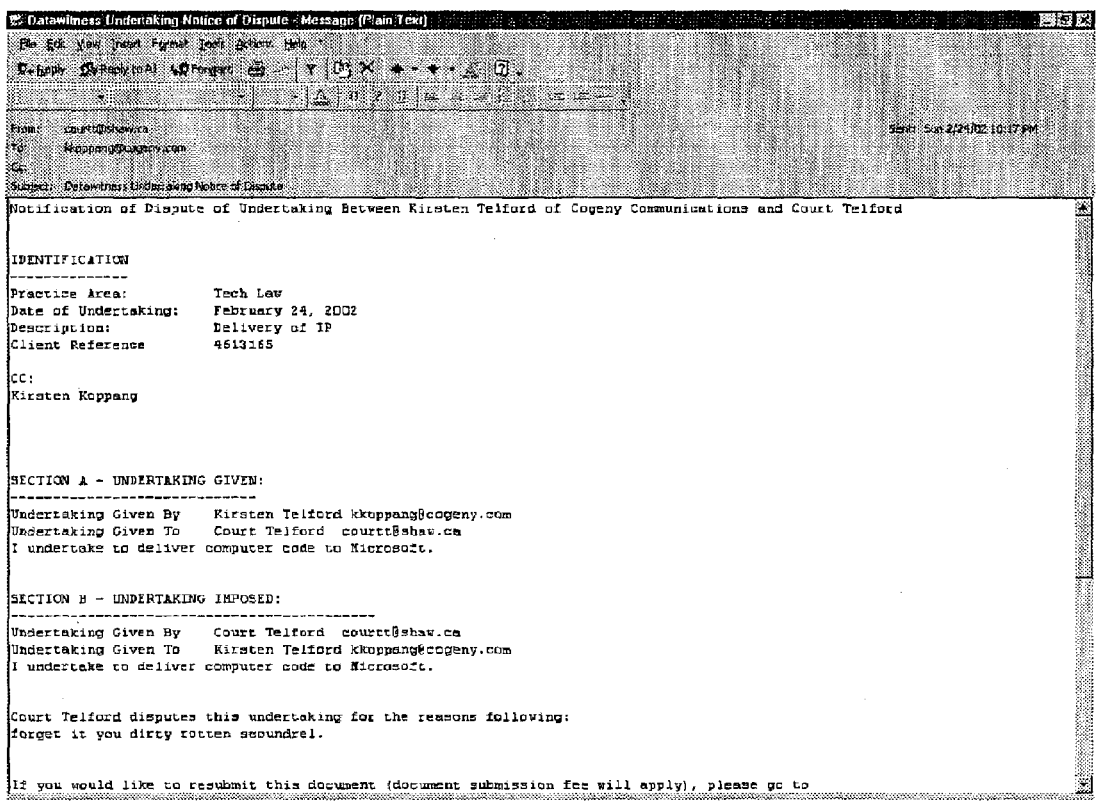

FIG. 14 is a screen capture diagram of a notification of dispute relating to a representative exchange of undertakings, of the sort dispatched to the initiator, with an opportunity afforded to the initiator to resubmit the undertakings.

Figure 15:
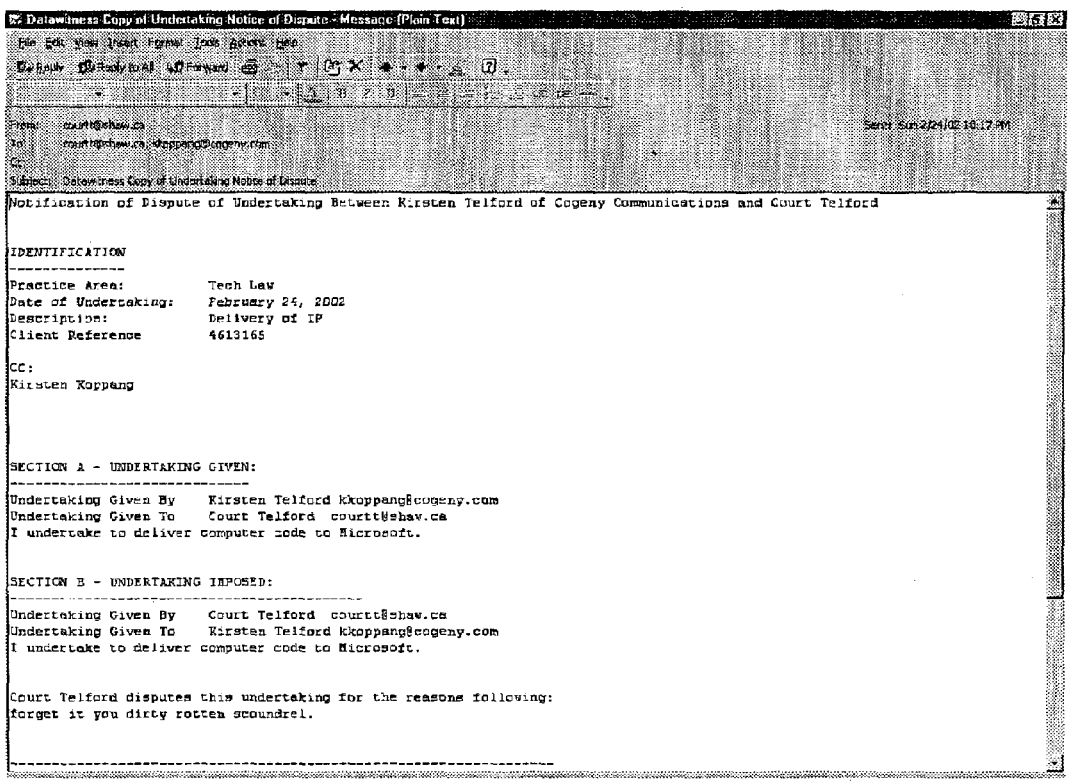

FIG. 15 is a screen capture diagram of a notification of dispute relating to a representative exchange of undertakings, of the sort dispatched to the parties and CCs to the submission other than the initiator.

Figure 16:
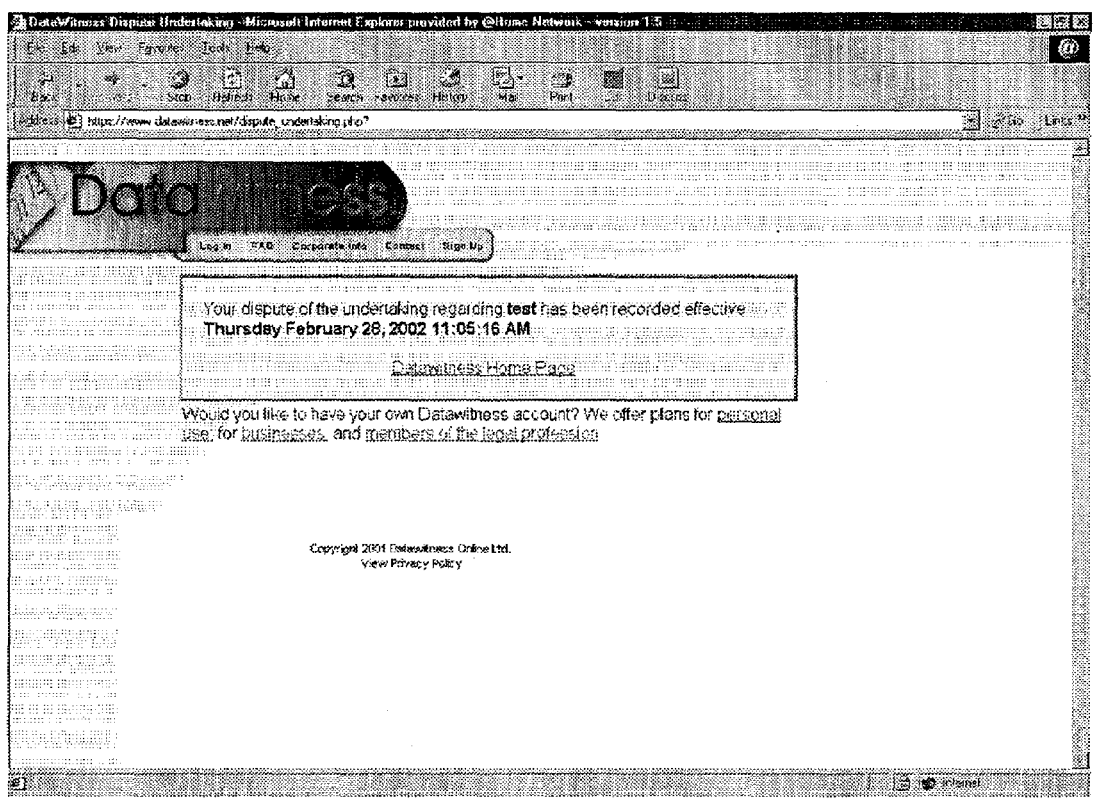

FIG. 16 is a screen capture diagram of a notification of recordal of dispute relating to a representative exchange of undertakings, of the sort that may be displayed on the authenticator's website.

Figure 17:
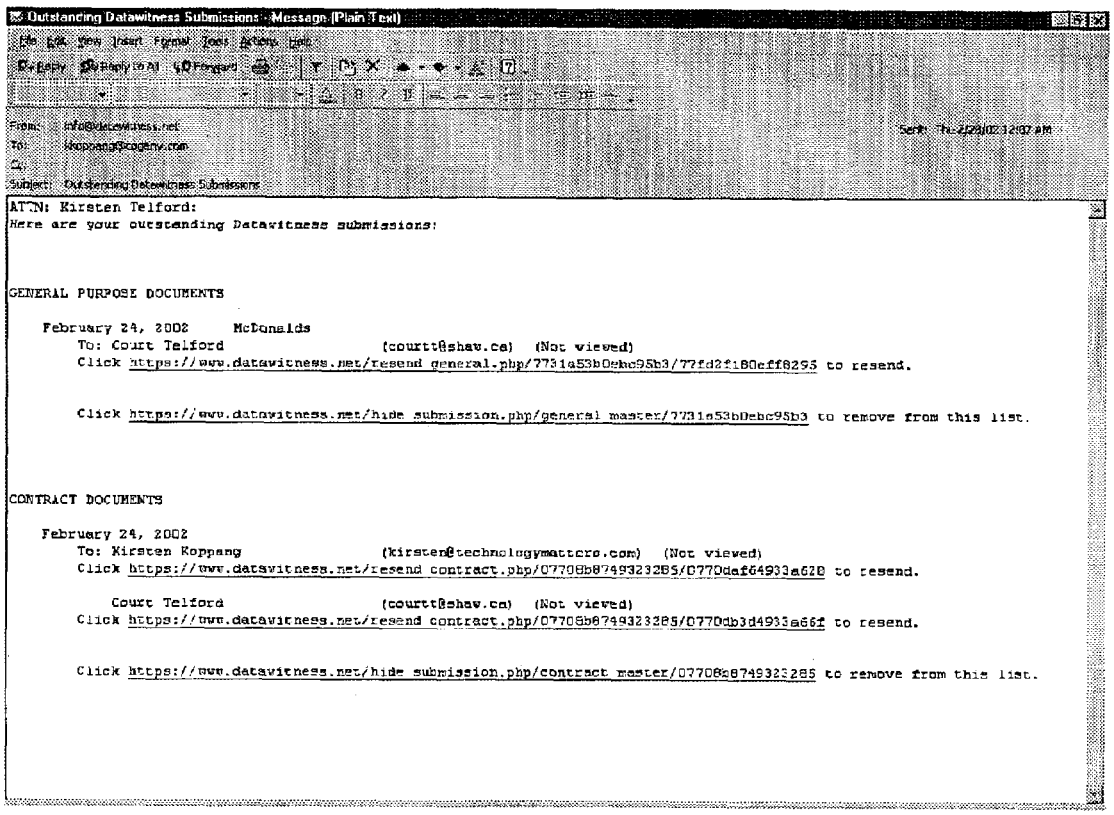

FIG. 17 is a screen capture diagram of an e-mail message from the authenticator to an initiator summarizing the initiator's active submissions and the respective status of each such submission.

Figure 18:
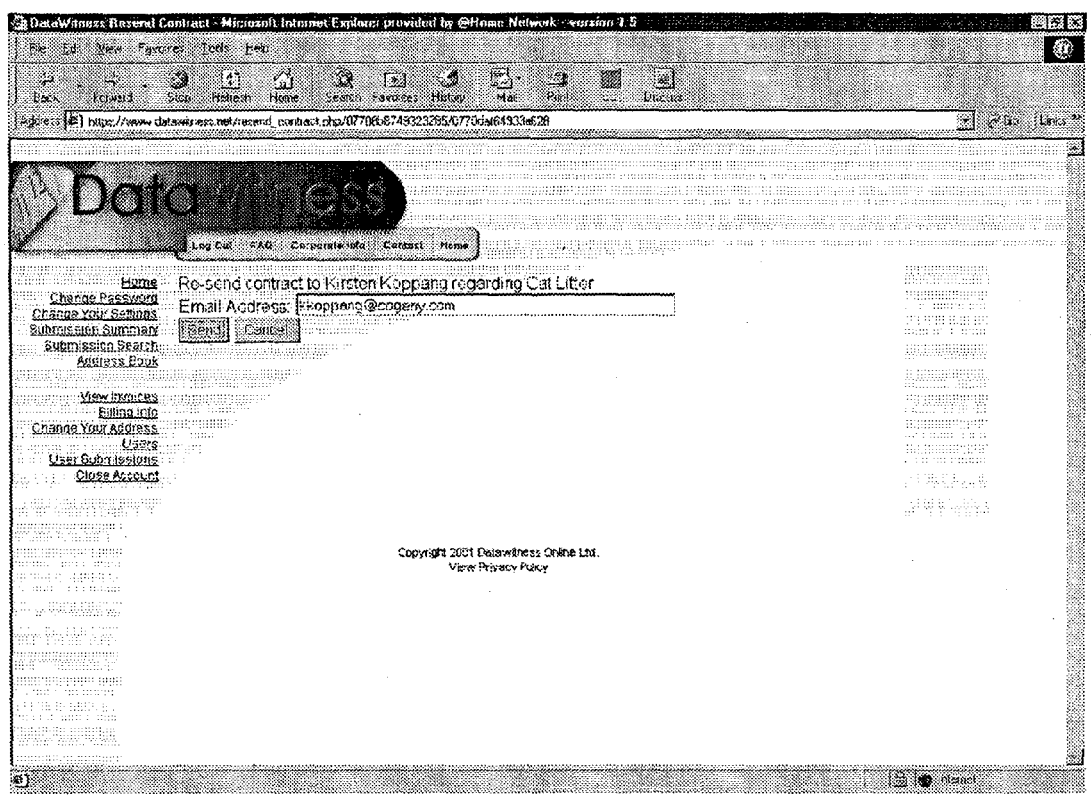

FIG. 18 is a screen capture diagram of a resend dialog box as displayed on a resend page of the authenticator's website.

Figure 19:
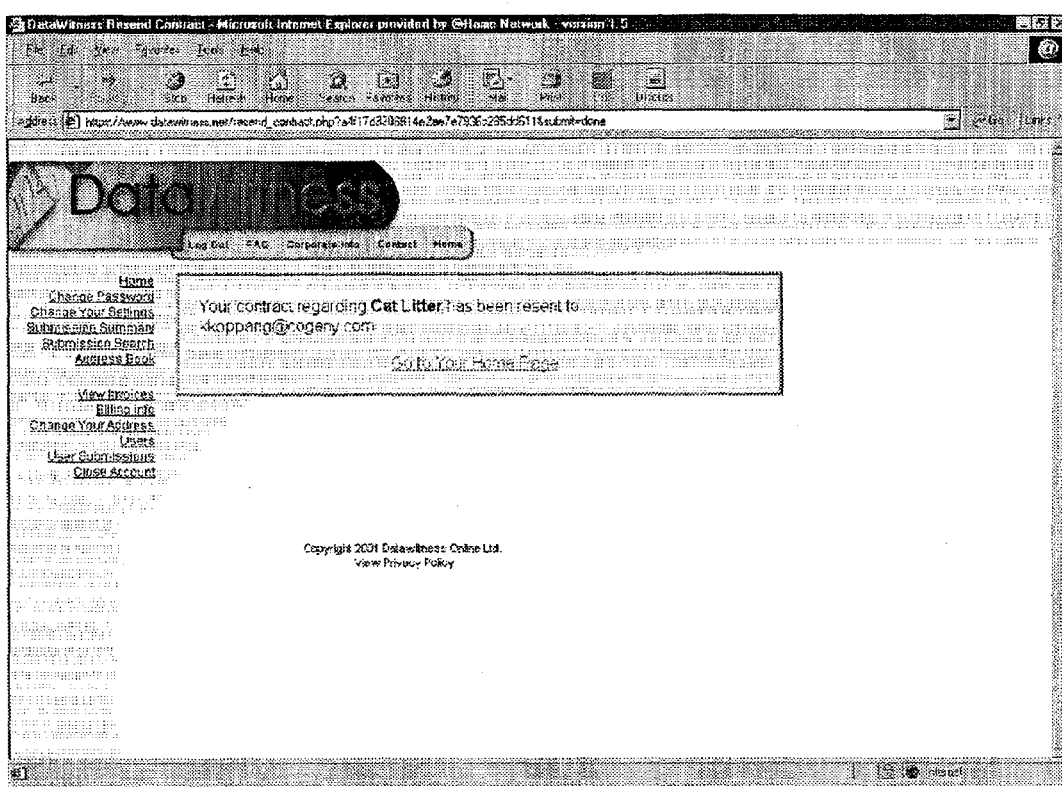

FIG. 19 is a screen capture diagram of a confirmation of resending a submitted message as displayed on a resend confirmation page of the authenticator's website.

Figure 20:
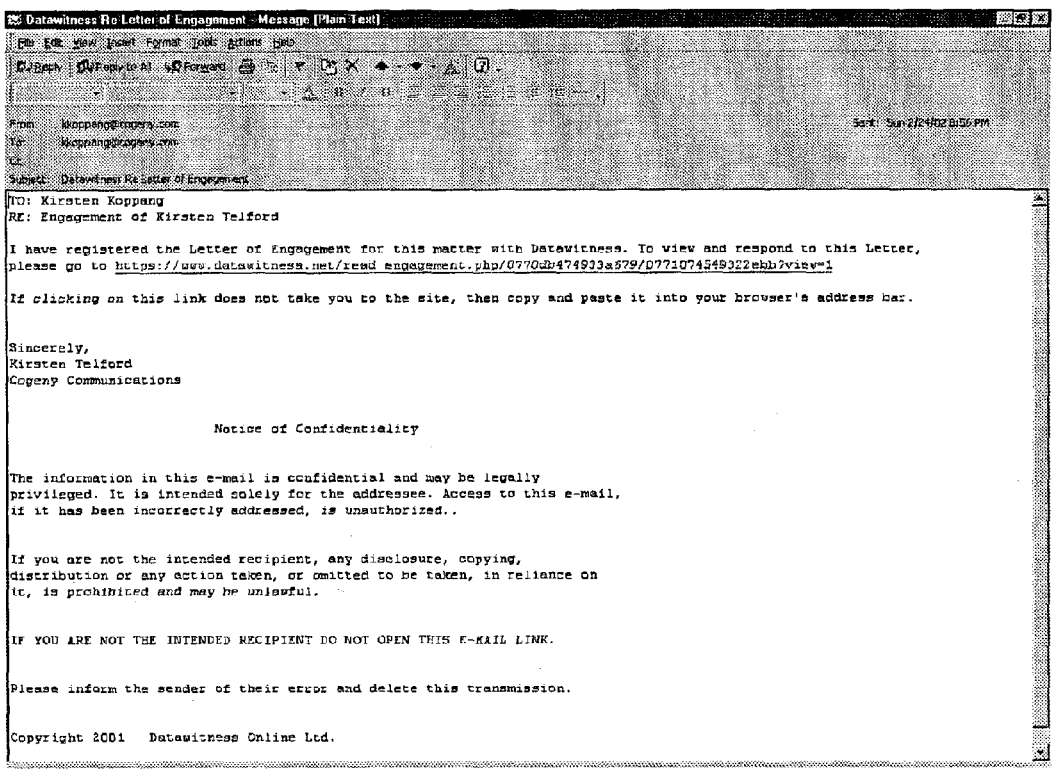

FIG. 20 is a screen capture diagram of a representative e-mail message containing a URL to a document to be viewed by a recipient.

Figure 21A:
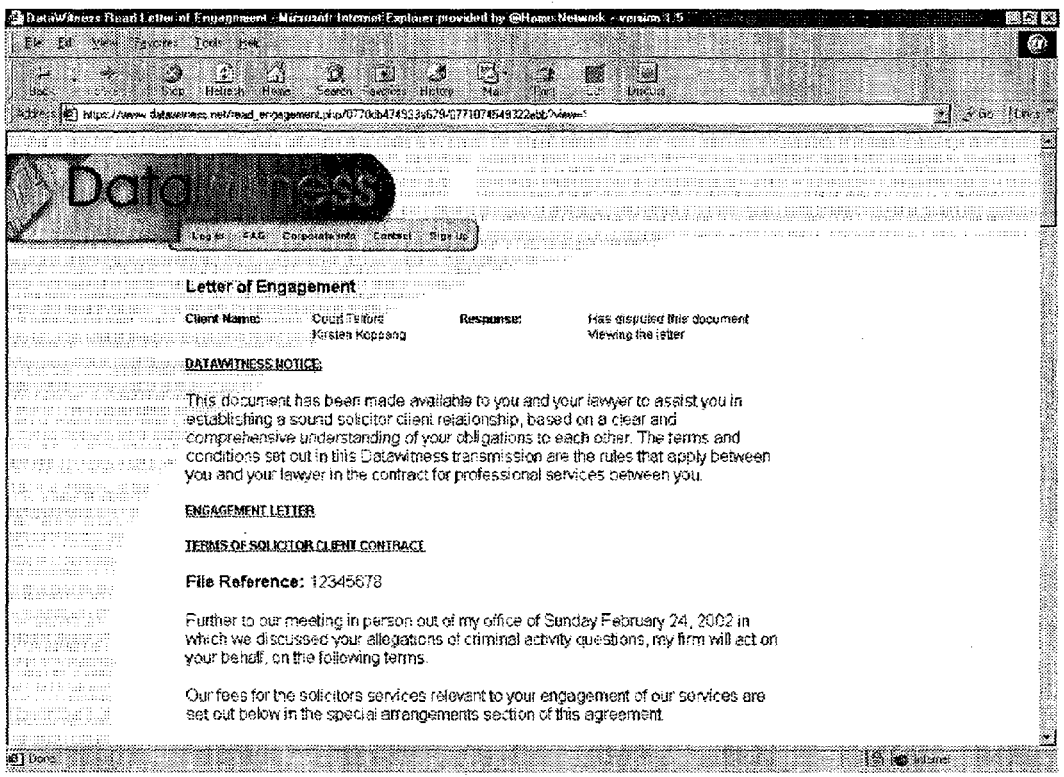
Figure 21B:
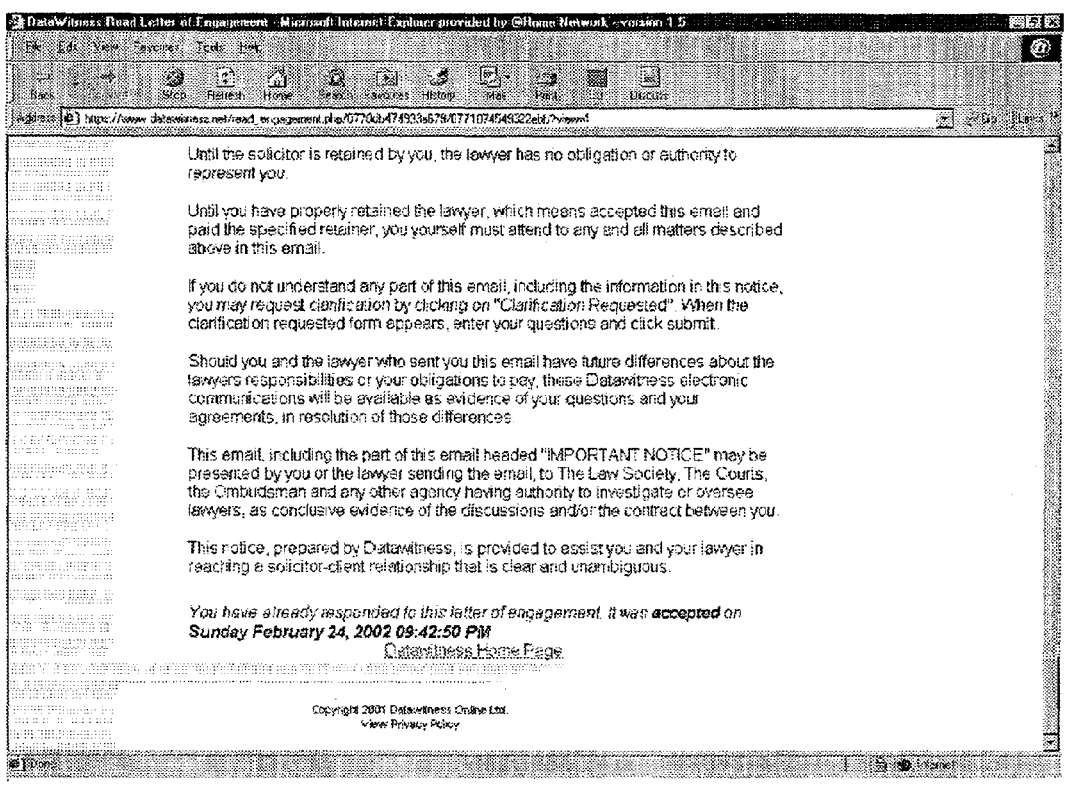

FIGS. 21A and 21B are respectively screen capture diagrams of the upper and lower portions of a representative display page confirming acceptance of a letter of engagement.

Figure 22:
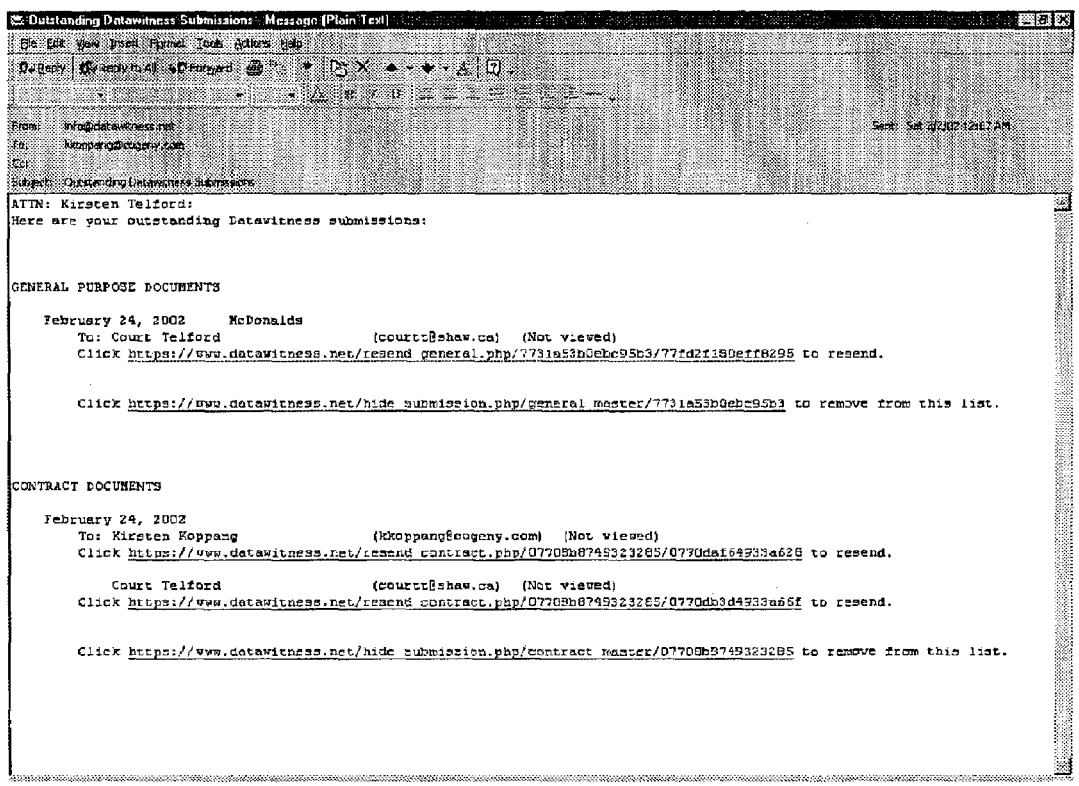
Figure 23:
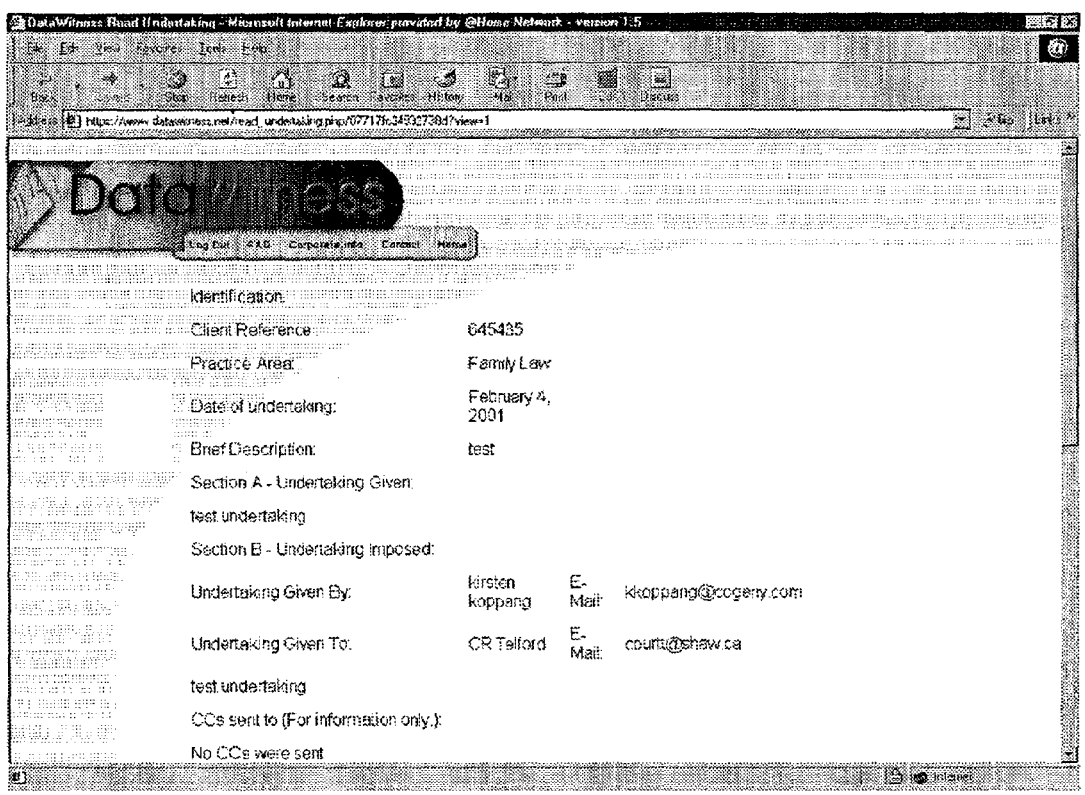
Figure 23:
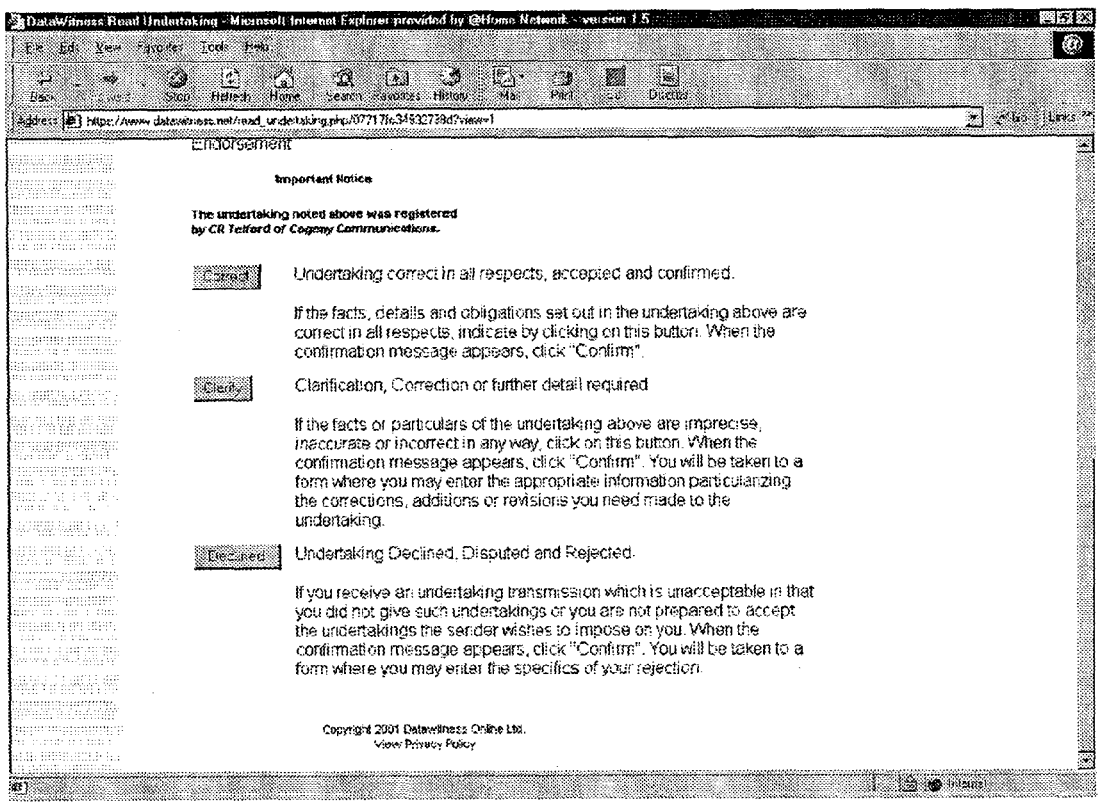

FIG. 22 is a screen capture diagram of a representative reporting submissions summary e-mail message sent to the initiator subscriber.

FIGS. 23A and 23B are respectively screen capture diagrams of the upper and lower portions of a representative submitted undertaking.

Figure 24:
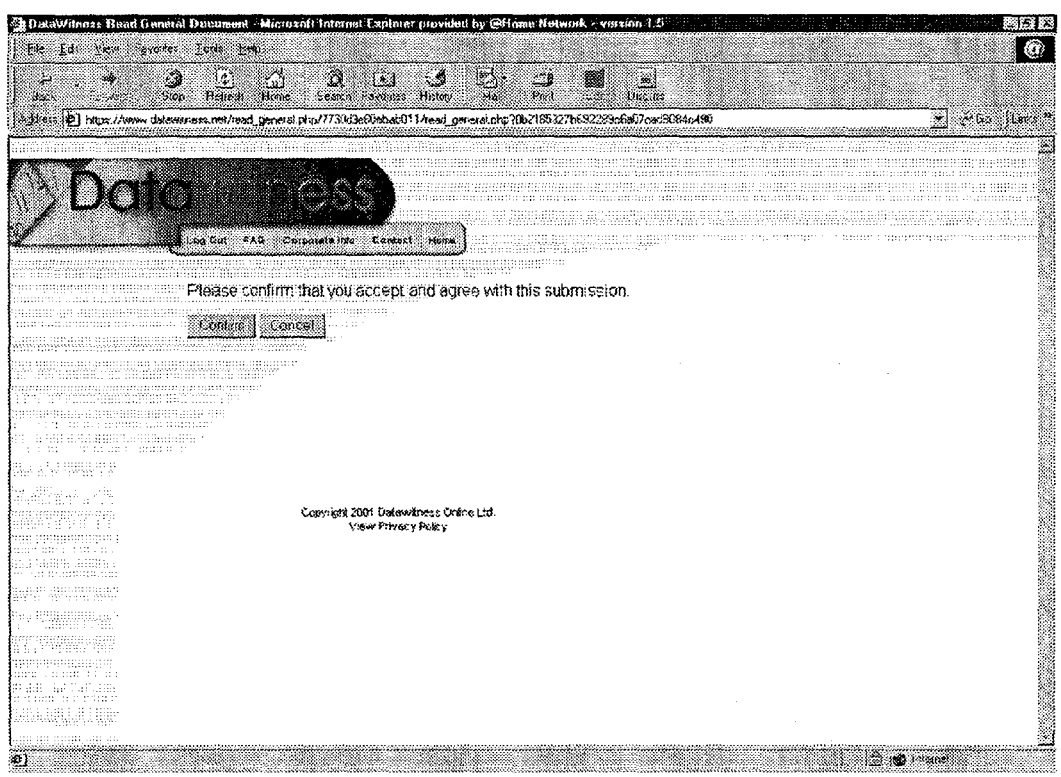

FIG. 24 is a screen capture diagram of a representative confirmation display page relating to a submission.

Figure 25:
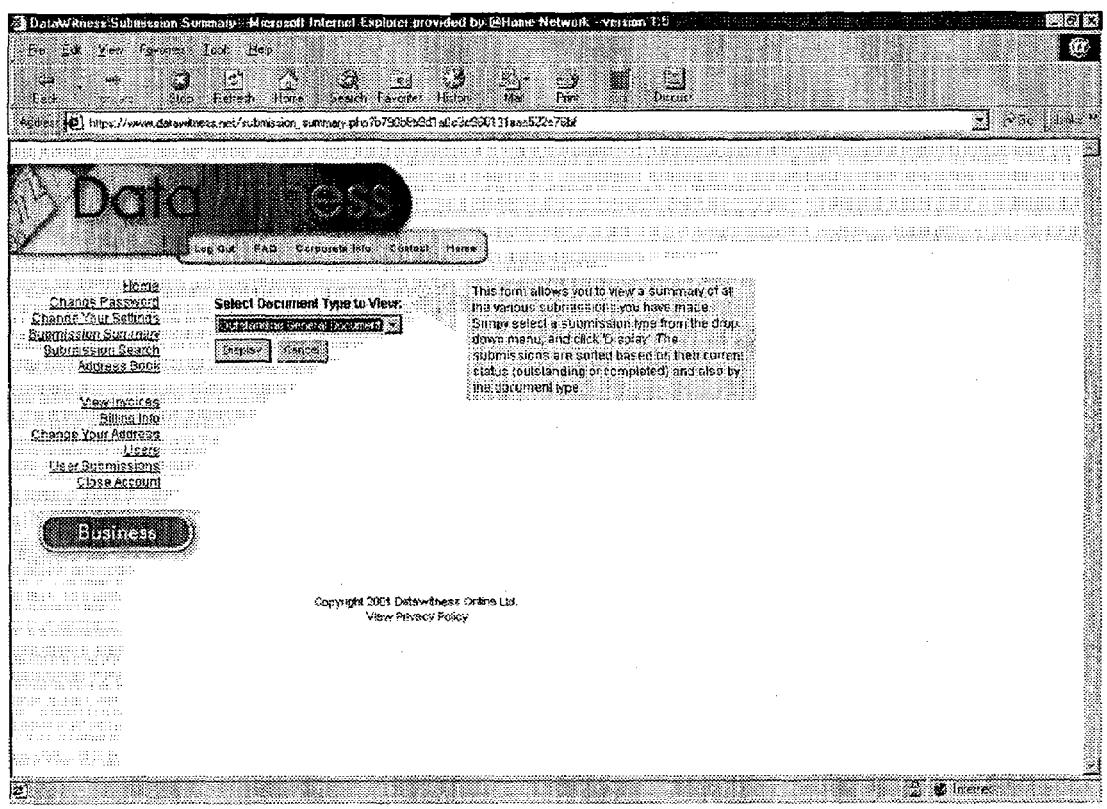

FIG. 25 is a screen capture of an incipient drop-down menu.

Figure 26:
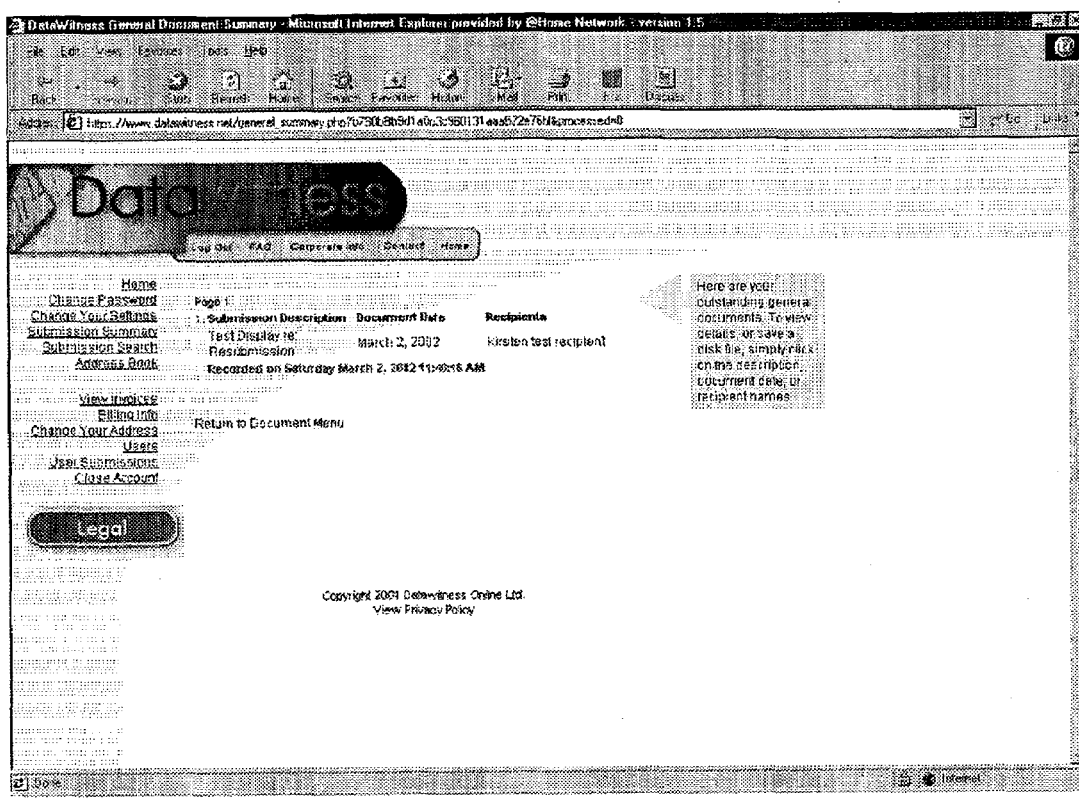

FIG. 26 is a screen capture listing general documents.

Figure 27:
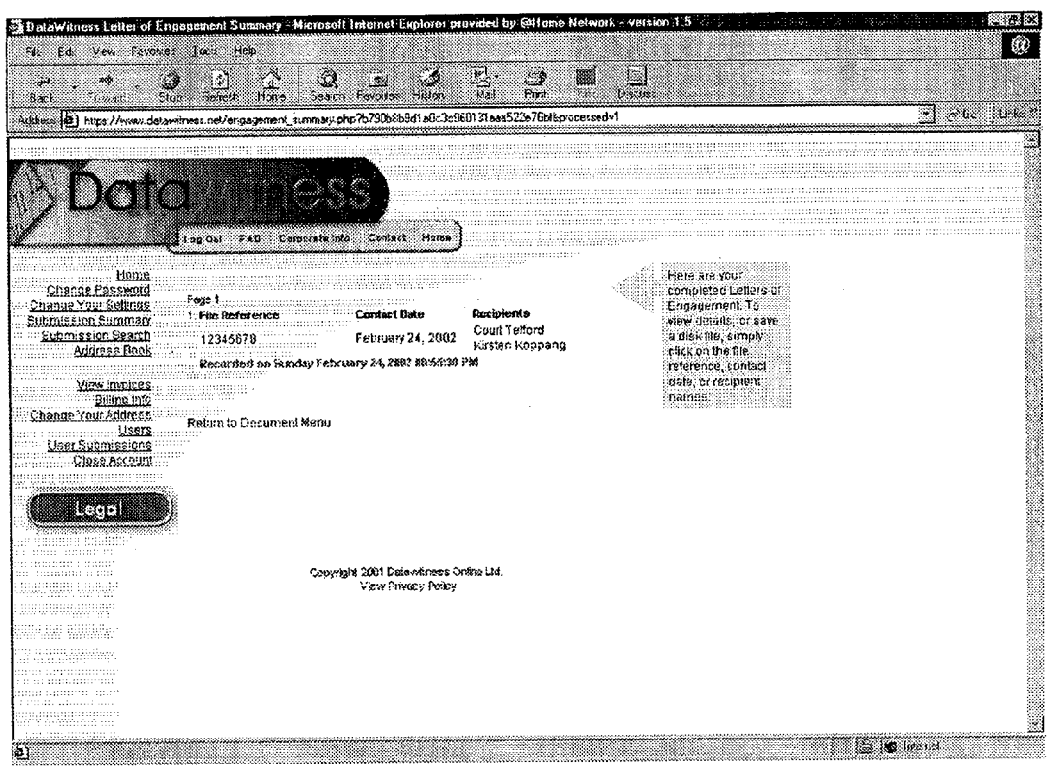

FIG. 27 is a screen capture listing letters of engagement.

Figure 28:
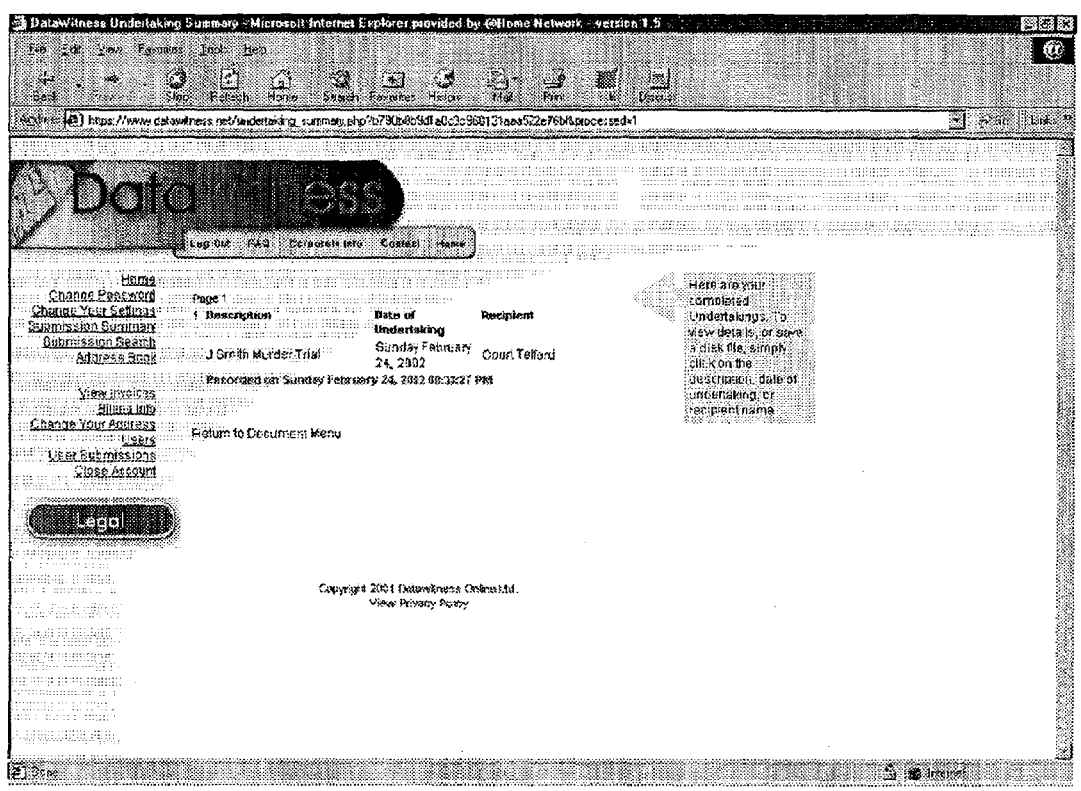

FIG. 28 is a screen capture listing undertakings.

Figure 29:
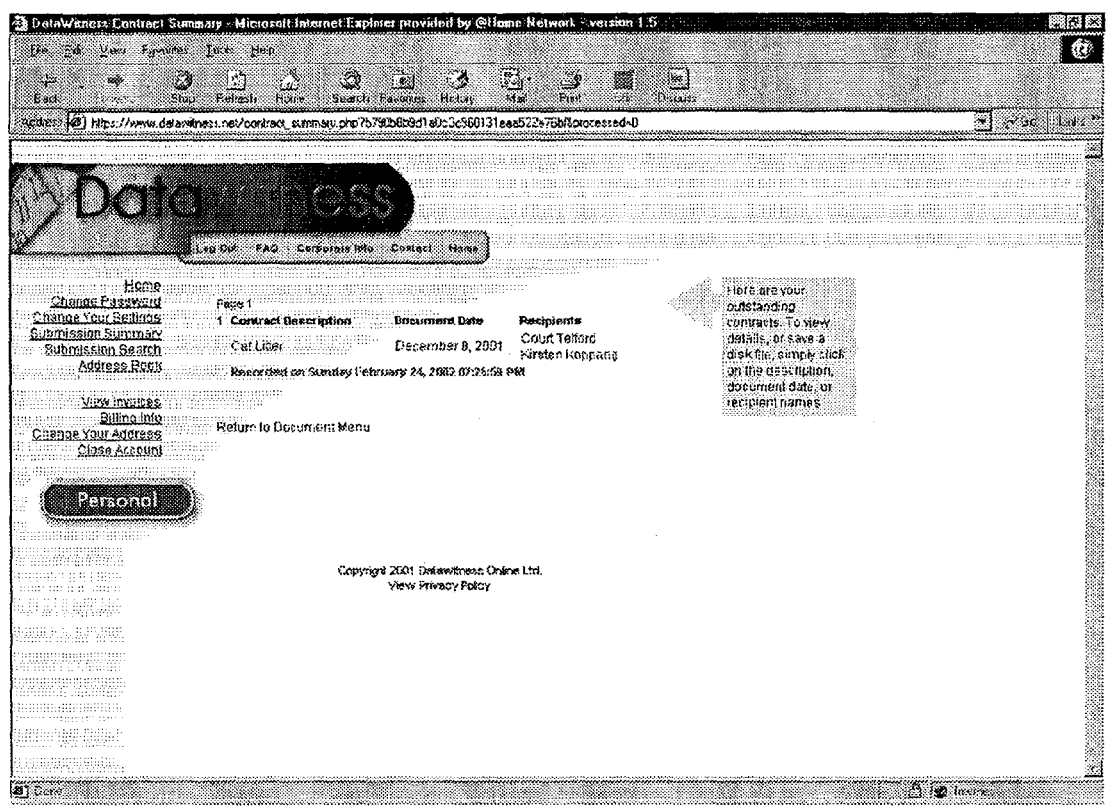

FIG. 29 is a screen capture listing contracts.

Figure 30:
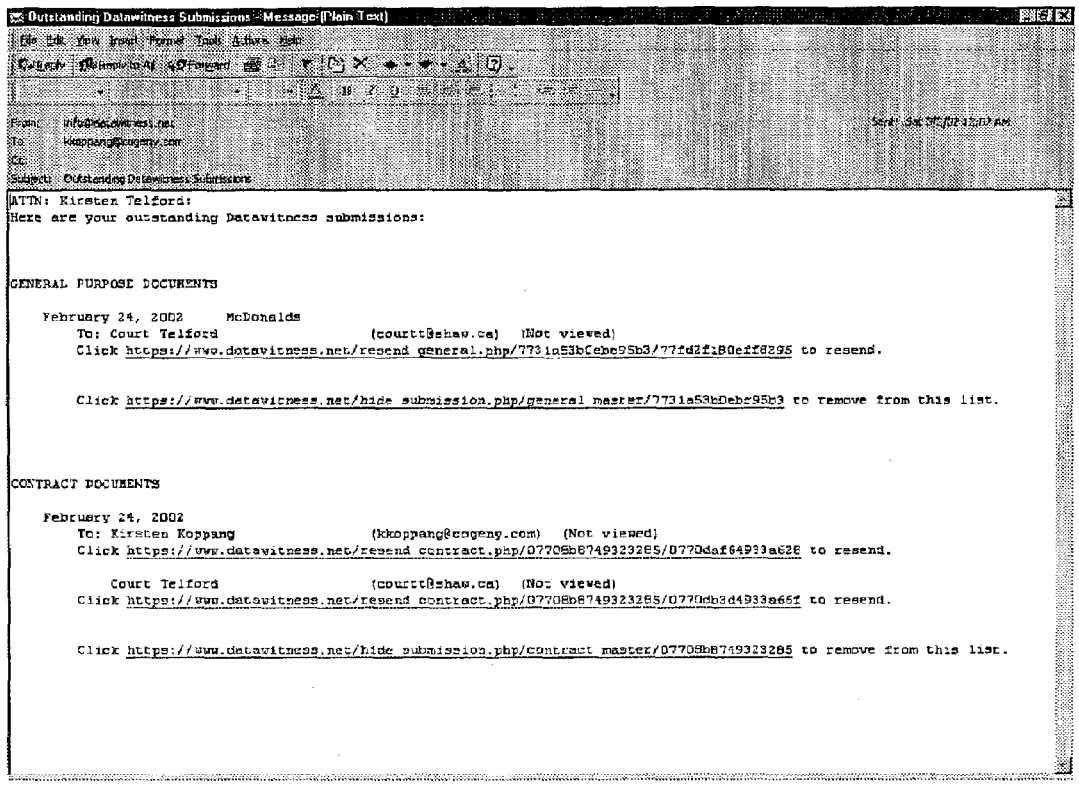

FIG. 30 is a screen capture of a submission summary email.

Figure 31:
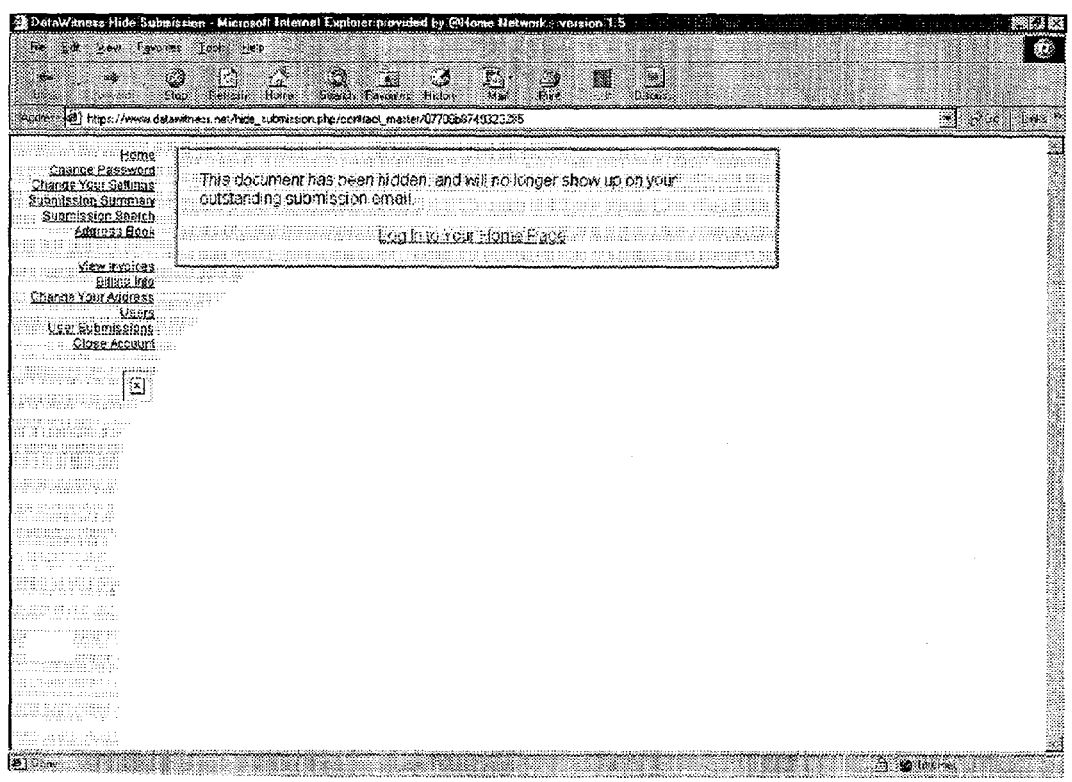

FIG. 31 is a screen capture of a hide function.

Figure 32:
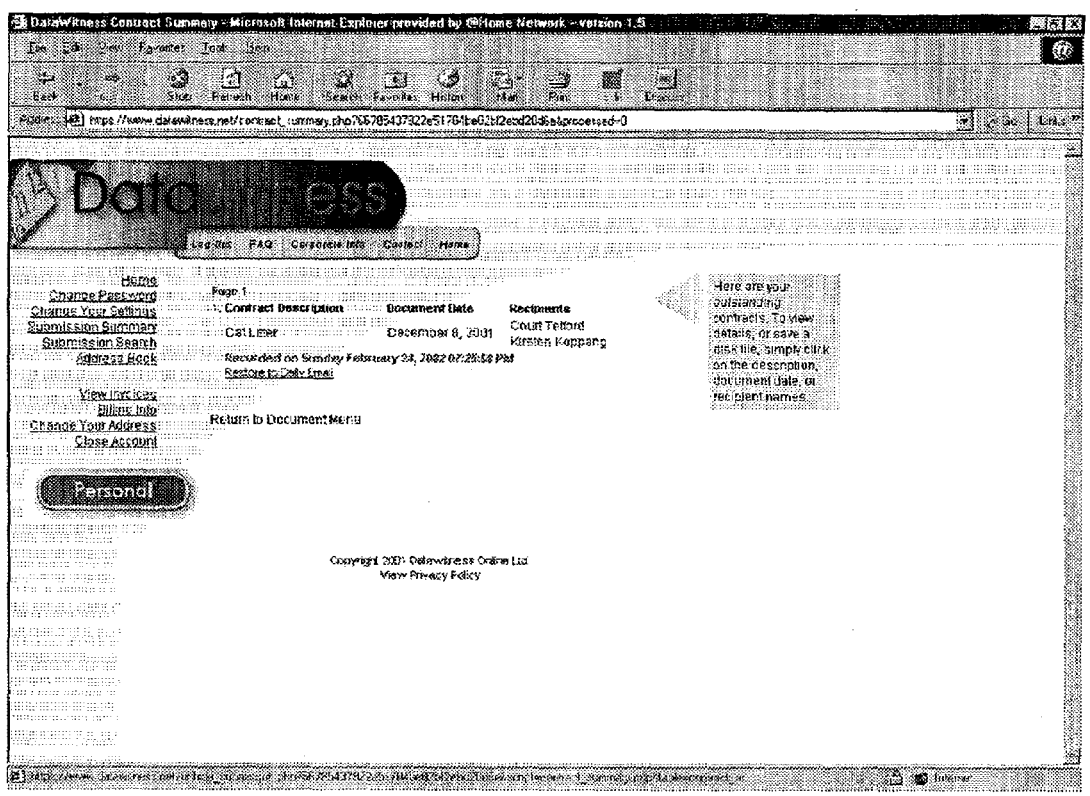

FIG. 32 is a screen capture of a submission summary page.

Figure 33:
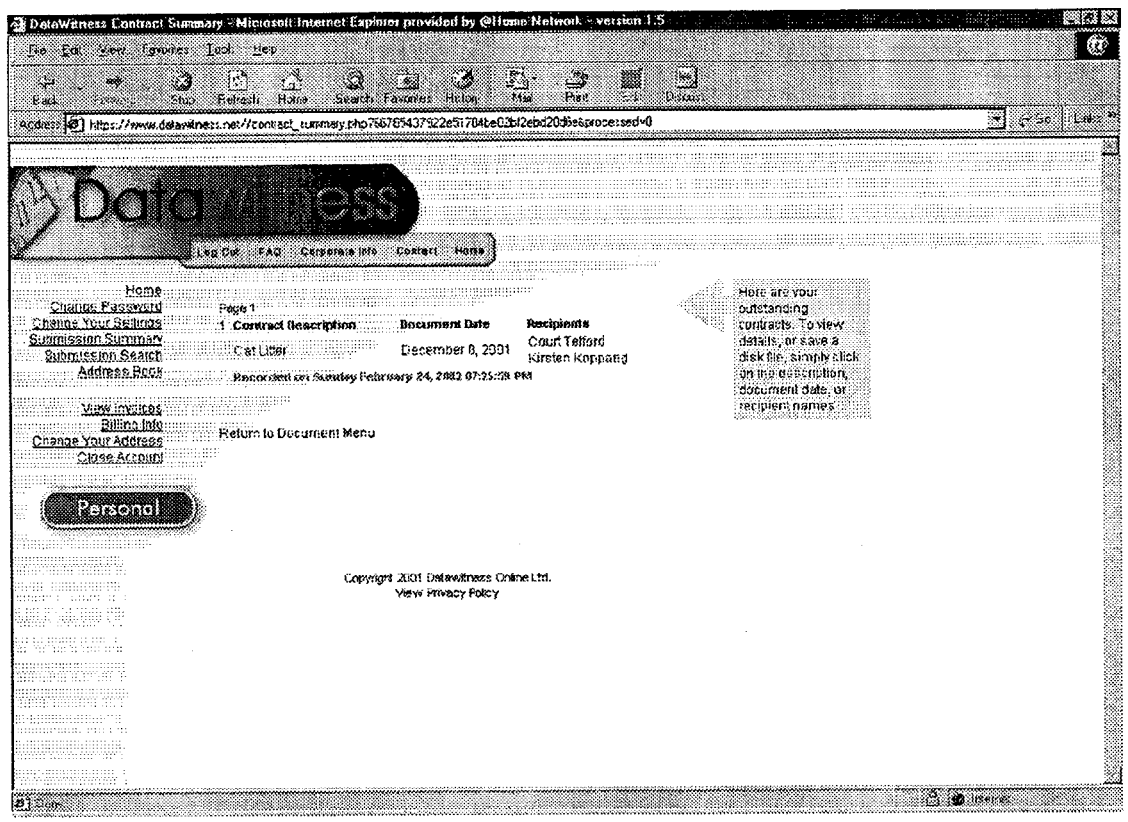

FIG. 33 is a screen capture of a refreshed submission summary page.

Figure 34:
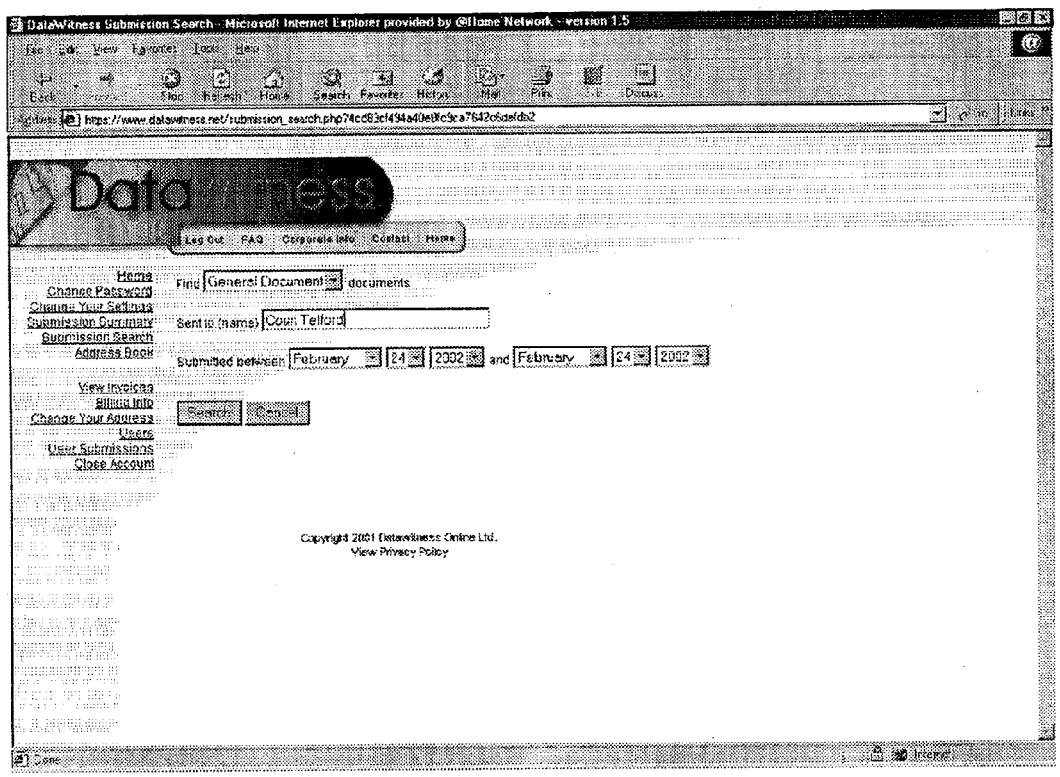
Figure 35:
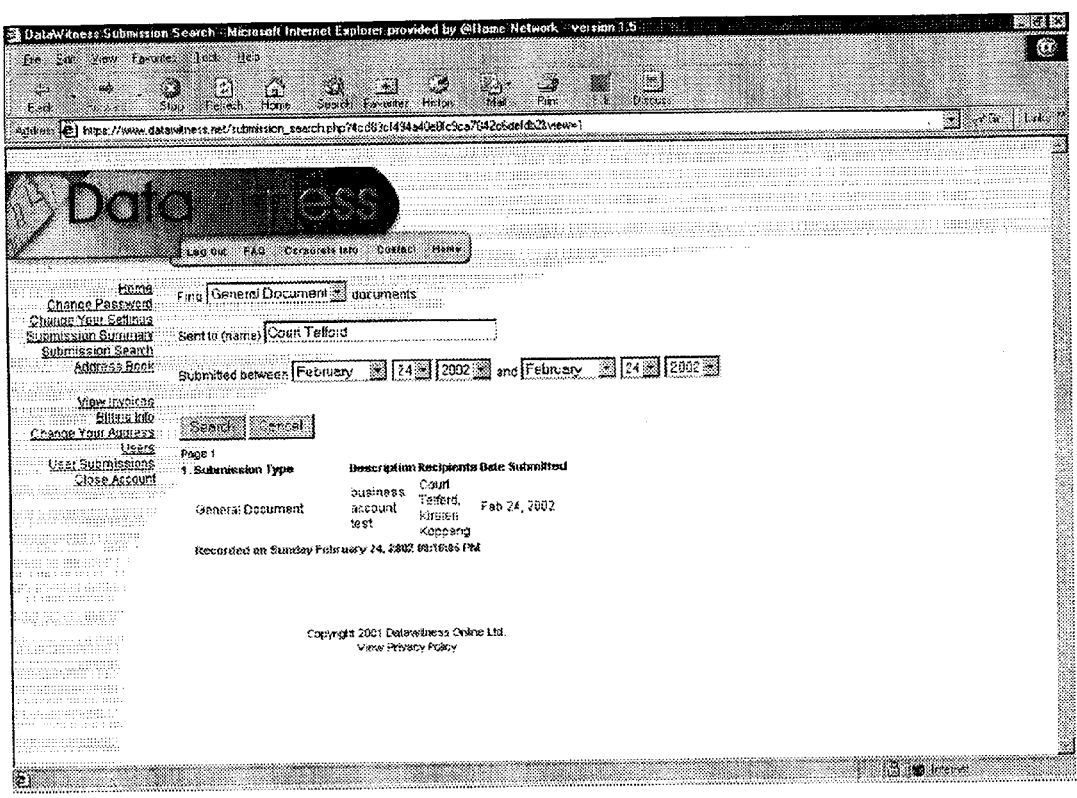

FIGS. 34 & 35 are screen captures of a search function.

Figure 36:
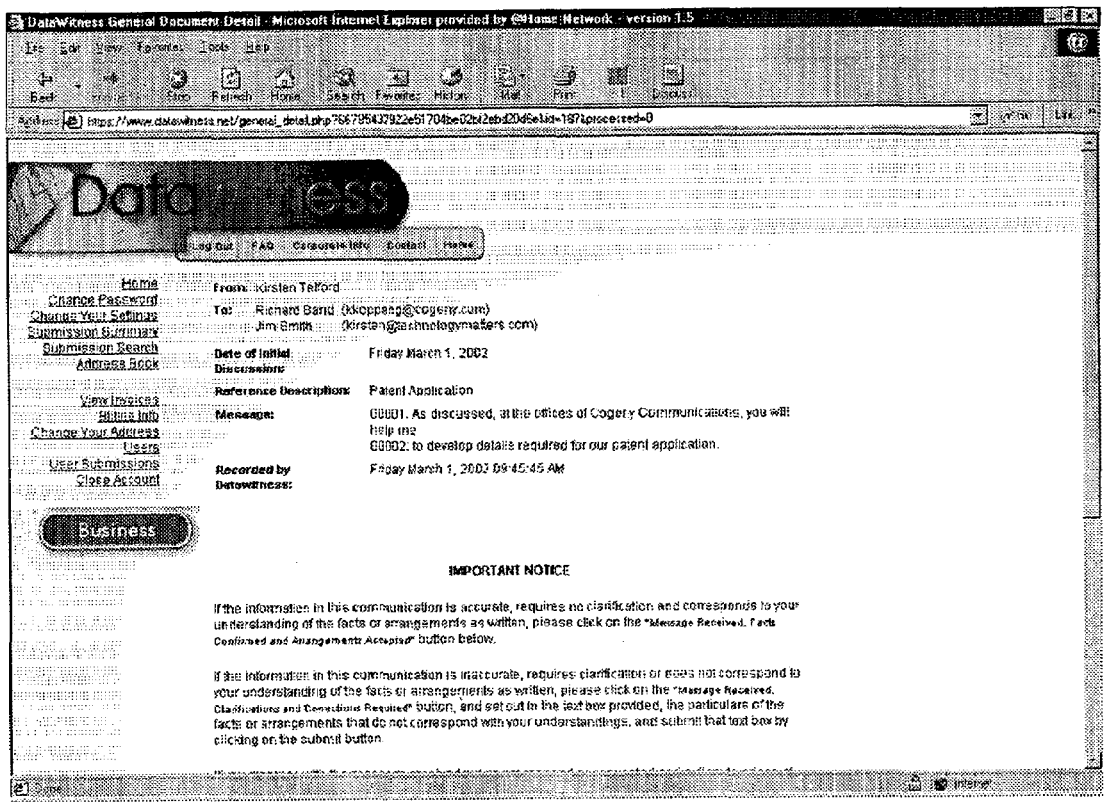
Figure 37:
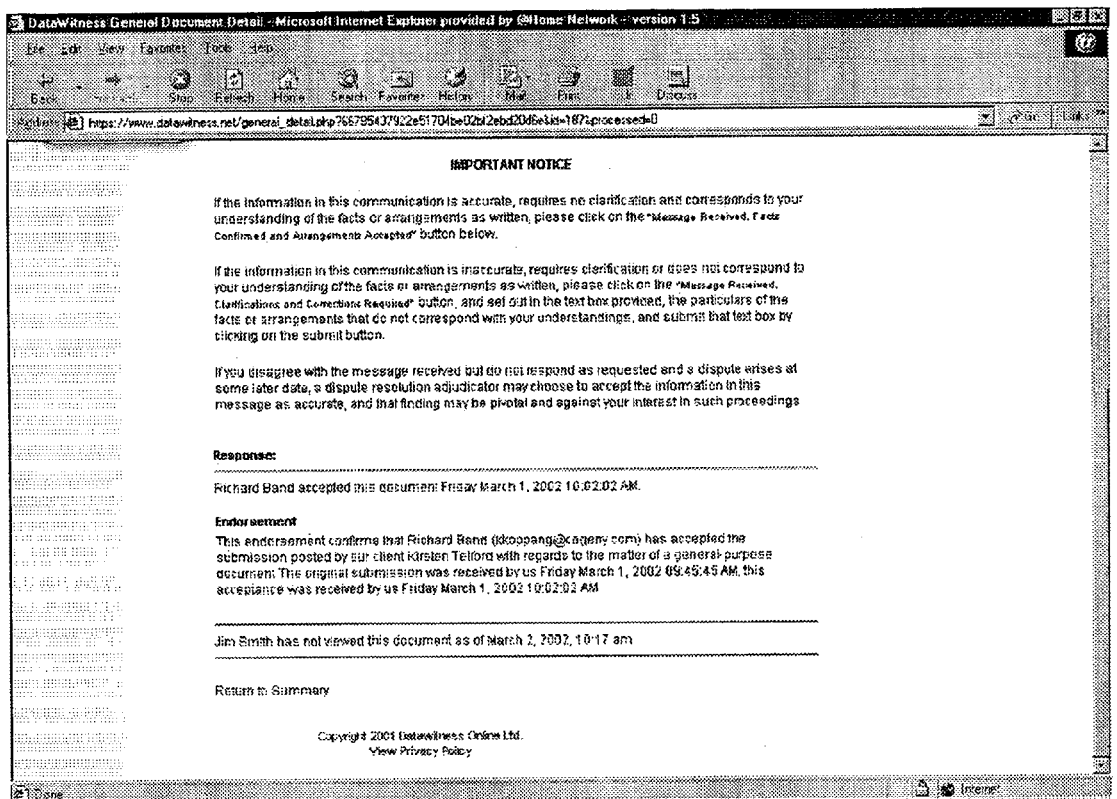

FIGS. 36 & 37 are screen captures of a page generated by a detail general function.

DETAILED DESCRIPTION

As mentioned, the system herein described by way of example is only one of a very large number of possible implementations of a message verification system according to the invention. The system described is an Internet-based system in which the authenticator maintains a website operated by a server whose functionality includes the databases, software, connections and interfacing needed to accommodate the functions and operations discussed with reference to this working example.

Figure 1:
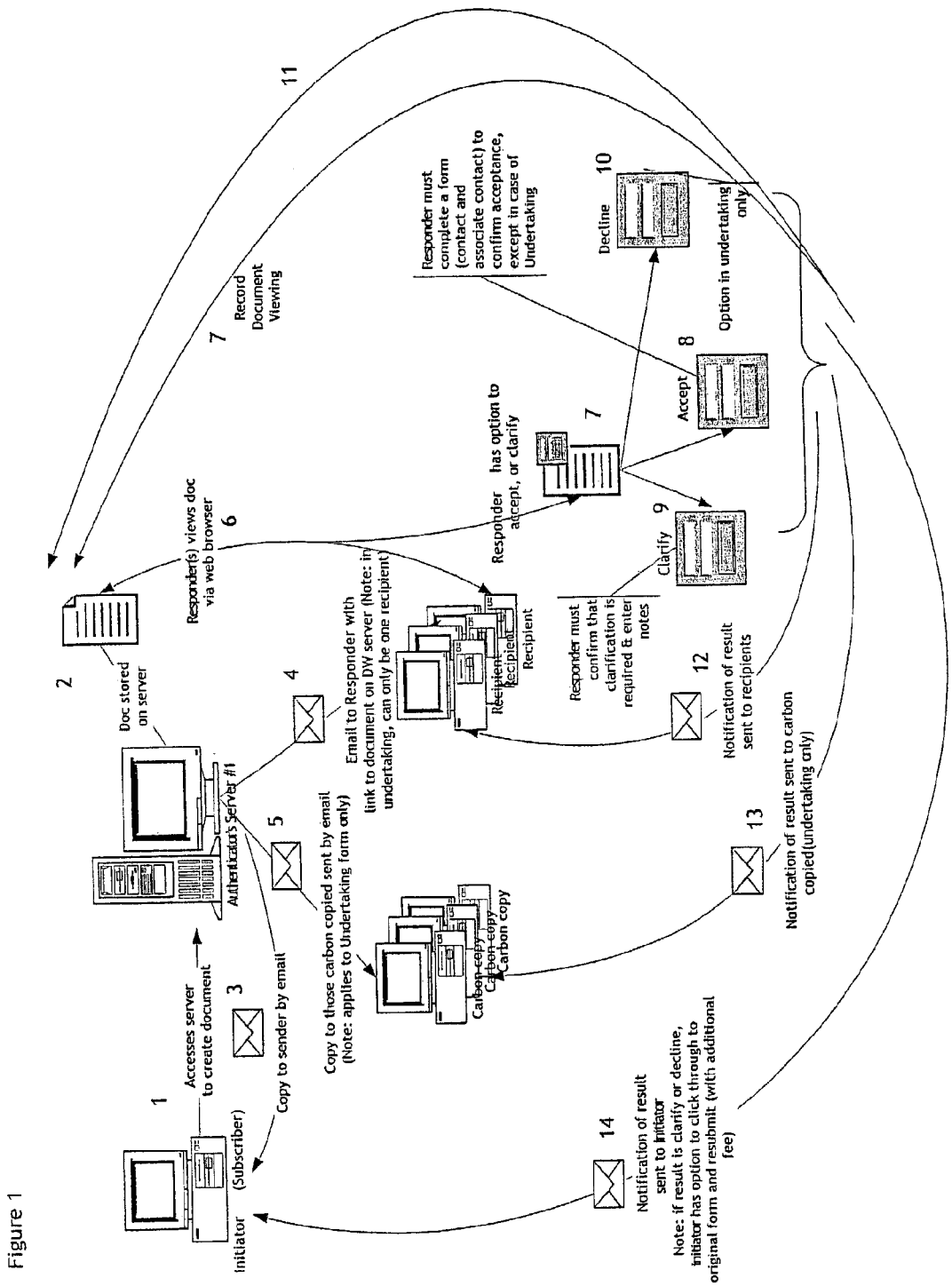
FIG. 1 is a schematic flow diagram illustrating the initial message creation, transmission and response, and associated authenticator's operations, in accordance with a preferred implementation of the message verification system according to the invention.

Referring to FIG. 1, a registered system user, being a subscriber to the authenticator's service, accesses the authenticator's web site (step 1 in the diagram), and selects a document to create, based on a list of document templates. This user, the initiator of the message exchange, is then prompted by the authenticator's webserver software to insert data into the electronic form, the data including an identification and the e-mail address of the intended recipient. The initiator may also similarly identify individuals to be "carbon copied" on the message ("CCs"). Such data and content of the document (collectively, for simplicity referred to as "the document") constitute, identify and direct the message to be transmitted. The user then enters the document to the authenticator's web server. Preferably the web server software checks the document for adequacy of vital information (e.g., e-mail address of recipient), prompts the user to enter missing information and, once the document has been accepted by the authenticator, the authenticator transmits the document accompanied by an accept/dispute/clarify or similar set of menu options to the designated recipients. Such transmission constitutes a submission to the recipients. Submission involves the following functions or steps performed on the authenticator's system:

The authenticator

Stores the document in a database on the authenticator's server;

Sends a copy of the document, preferably time- and date-stamped, as text within or as an attachment to an e-mail message, to the initiator's e-mail address (step 3 in the diagram of FIG. 1);

Sends an e-mail message containing a hyperlink (URL link) to the document to the recipient's e-mail address, with a request that that the recipient view the document and respond (step 4);

Sends a copy of the document as text within or as an attachment to an e-mail message, to the CCs' respective e-mail addresses (step 5).

The recipient as responder has the option to select ("click") the link in the received e-mail message. This URL link directs the responder's web browser to a page on the authenticator's server. This page displays the document, with options for the recipient to respond (step 6). As soon as a recipient views the page, the authenticator's server records the time of viewing by the recipient in a database (step 7). Options for response vary based on the type of document, but typically include some or all of 'Accept' (option 8); 'Clarify' (option 9); or 'Decline' (option 10).

Note that it is important in this embodiment of the invention that the authenticator's system provide to the recipient not the text of the submitted document but rather a URL link to the document. This constraint forces the recipient to interact with the authenticator's system in order to view the document. The act of viewing itself may be of importance in the history of the exchange of communications, and is of practical concern because if the recipient after some suitably selected period of time has not viewed the document, the initiator may wish to resend the document. By requiring the recipient to take a detectable step in the authenticator's system to view the document, the authenticator has the capability to record the fact of viewing, the date and time of viewing, as well as any response (or lack thereof) made, and the initiator can be alerted if there has been no viewing within a reasonable period of time.

Once a recipient has responded by clicking a response option, and entering a request for further data (desired clarification, for example) if so desired, this action is recorded by the authenticator's server 11. The authenticator's system then notifies by e-mail all parties (including CCs) named in the document, or posts the notice for accessing on the authenticator's website by any of the parties (steps 12, 13, 14). if the response was 'Clarify' or 'Decline', the initiator has the option to resubmit the document, with revisions. Note that the process may continue until all recipients have responded affirmatively, or the initiator chooses to discontinue or to accept the position taken by the responder. Optionally, CCs may be given full or restricted power of response.

Within the authenticator's system, the following functionality, among other functionality some of which is not specifically described in detail herein, exists. The functionality may be implemented, for example, by a set of php command/script display instructions.

Create document: New Document Creation—Determine which form (from among a number of form options) has been chosen by the initiator, and direct the initiator to the appropriate script and fields of the authenticator's interface. By way of example, four discrete types of document are identified in this description; these head the four alternative flow streams illustrated in FIG. 4. These document types are Contract, Engagement Letter, Undertaking, and General Purpose Document. Other suitable types of document could be used to supplement those exemplified, for example Generic Personal Form, Generic Business Form, Expense Account, and Client Timesheet.

Read: Once the document has been created and sent to the intended recipients, a URL link is created and displayed in the e-mail message, thereby permitting the recipient to access the authenticator's website and to read the content of the initiating message. The Read function may vary depending upon category of document, as, for example:

Read Contract—When the recipient clicks on link in e-mail notice of contract, the linked script displays the contract and, once a response is made, records the responder's action (accept, clarify, reject, or as the case may be).

Read Letter of Engagement—When a lawyer or prospective client clicks on the associated link in an e-mail notice of letter of engagement, the linked script displays the letter and any response made.

Read General Purpose Document—When the recipient clicks on the associated link in an e-mail notice of document, the linked script displays the document and any response made.

Read Undertaking—When the recipient clicks on the associated link in an e-mail notice of undertaking, the linked script displays the undertaking and any response made.

In general terms, Read allows a recipient to access a submitted document via a link from the e-mail message sent by the authenticator notifying the recipient of the document. A website page generated by the authenticator's Read function can be accessed only via the e-mail link. If multiple recipients are viewing the same document, they are able to see on this page any responses made by other recipients. The Read function provides a different display of the document from what is accessible by the initiator as it provides the recipient with response options and calls the Accept and Dispute scripts to display these options and record any response made by the recipient.

An initiator of documents can return to those same documents via the initiator's account-linked web access, and specifically via a Submission Summary function to be described further below. This function presents a menu of all document types that the initiator has previously created, and allows the initiator to select the document type sought. The initiator is also able to track activity, as related to documents, via e-mail messages that can be sent on a regular basis, daily for example, or on demand. A given e-mail message might list the status of all documents previously created but not responded to, and indicate whether the documents had been viewed or not, and might give the initiator further options, including the option to resend the document, or remove it from the e-mail summary. By means of an optional feature, the initiator may be notified or may be able to determine from the initiator's home page that a particular recipient is at the moment of notification viewing the submitted document. That knowledge might be advantageous to the initiator, who might, for example, wish to place a telephone call to the recipient immediately after the recipient has begun to view the submitted document.

The Retrieve function is used by the authenticator's system to access stored data. The function permits the initiator or an authorized party to write to disk or to other selected electronic medium, or to print the contents and other particulars of a stored message exchange. This facility is useful if retrieval of data is required for evidentiary purposes, as well as for general reference.

Accept: Once the document has been viewed by the recipient, the recipient as responder may accept, reject, modify, request clarification, etc. as permitted by the system. If the responder elects "Accept", again the acceptance may be recorded and displayed by document type if desired. In such cases, the following acceptance functionality would exist:

Accept Contract—Records acceptance 'acceptance flag' in the authenticator's web server database. If there are more than one recipient and if all recipients have accepted, the authenticator's web server may mark the master record for the initiating document as having been accepted. If there is no universal acceptance and any recipient has disputed or rejected the proposed contract, the authenticator's web server may mark the master record as disputed, or as the case may be. If acceptance has occurred, a notification of acceptance is dispatched to the initiator and optionally to Ccs.

The Accept Engagement, Accept General Purpose Document, and Accept Undertaking functionality are essentially analogous to the Accept Contract functionality.

Dispute: The Dispute functionality is essentially parallel to the Accept functionality, with the master record marked or flagged as disputed, and the notification of dispute sent to the initiator and optionally to CCs.

The Clarify functionality is also essentially parallel to the Accept functionality, with the master record marked or flagged as requesting clarification of the submitted document, and the associated notification sent to the initiator and optionally to Ccs. The Dispute and Clarify operations may optionally make available to the responder the opportunity to make a counterproposal.

Optionally, an Edit functionality may go hand-in-hand with the Dispute and Clarify functionalities. For example, the party wishing to dispute or request/provide clarification may edit the document, and the emendations (and perhaps comments within the body of the document—see below) are preferably displayed in such a manner as to quickly draw the viewer's attention to the differences between the document sent and the document edited. This may, for example, be accomplished by providing a side-by-side color-coded "compare" screen in which material that is added, deleted, or otherwise modified is indicated in different colors from the original material.

A Comment functionality may optionally complement the Dispute and Clarify functionalities. The Comment functionality allows a user to add a comment within the body of the document without changing the text of the document itself. Any such comments are preferably displayed in such a manner as to quickly draw the viewer's attention to the differences between the document sent and the document edited; for example, the comment could appear in a box.

The Resend and Resubmit functionalities are available to the initiator if an acceptance of the submitted document does not occur. If a recipient has not viewed the submitted document, the initiator may elect to resend it, preferably with the option of substituting a fresh e-mail address for the recipient. If the submitted document has been disputed or the subject of a clarification request (with, optionally, emendations made using the above-described Edit functionality), the initiator may resubmit the document to the recipient, typically with some additional or substitute text.

The Resubmit functionality admits of a number of options so far as the initiator is concerned. If the next move in the negotiation or exchange of communications is with the initiator, the initiator may optionally resubmit the document as a revised document or conceivably as a renewed document unrevised as to essential content but including additional comment on why the document should be accepted, or otherwise as the initiator may elect. Appropriately, any resubmitted document may be linked back to the original initiating document. In that event, the authenticator upon resubmission arranges to have one or more recipients of the original document e-mailed a fresh message including links to the resubmitted document. The initiator at its own risk may opt to communicate outside the authenticator's channels in order to attempt to persuade the recipient to accept the resubmitted document, but as any extra-authenticator communications will not necessarily be reliably preserved, at least one of the parties may be expected to insist that all communications be kept or at least duplicated within the bounds of the authenticator's system.

To any subscriber to its services, the authenticator may make available a Document Retrieval Summary or File Retrieval Summary that displays to the subscriber a summary list of current or archived general purpose documents or files to be selected for printing or disk storage. These summaries may be broken down by document type, if desired, or by other criteria such as completeness, and may preferably be shown in chronological order.

Search: Various search opportunities and capabilities associated with the authenticator's database may be made available to subscribers. For example, a Submission Search would allows subscribers to search for submissions made by them. Searching would be permitted within selected fields of the authenticator's database such as e-mail address or name of recipient or CC, date of submission, etc. Searching other data, such as invoice data, may also be provided to subscribers. Note that it will probably be convenient for the authenticator to operate a number of discrete databases for different purposes rather than a single comprehensive database for all stored data. This is a matter of design choice; reference herein to "the authenticator's database" or the like should be taken as embracing the possibility that the authenticator operates several database, in which case the appropriate selection of database should be made. Equally, any reference herein to a discrete database limited in content to one or more defined categories of data should be taken as embracing the possibility that the discrete database may be a component of a larger more comprehensive database.

The authenticator's server would also be equipped with other functionality of the kind conventionally associated with other Internet-based types of subscriber service, including a customer database with address information and other particulars, and a customer's access password. If the subscriber is a corporate subscriber, entry of and access to stored data pertaining to the corporation can be limited to the authorized administrator or other liaison person employed by the corporation, for example, and optionally to individuals authorized by the administrator. An established authorized procedure for amending subscriber data or for changing the subscriber's password, etc. can be provided; such procedures are conventional in association with a wide variety of Internet-based services. Some of the functionality described above is conventional in other contexts; for example, many Internet-based enterprises require a Read and Retrieve function or the equivalent.

Some of the interfaces and web pages used by the authenticator may make available to interested viewers information about the authenticator's services, while other interfaces and web pages would provide access to the authenticator's facilities by its subscribers. For general access, there could be, for example, pages detailing contact information for the authenticator, an overview and detailed description of the authenticator's services, answers to frequently asked questions, registration of new subscribers, etc. For subscribers, web pages and interfaces could be provided for conducting searches, selecting an initiating document, changing subscriber-related data, arranging payments, arranging identity authentication services, etc.

Although the connectivity of a system according to the invention with associated systems via the "back end" is conceptually novel, affording additional functionality and advantages in accordance with other aspects of the invention, the connectivity details may optionally include a number of conventional connectivity elements and attributes. Included among such novel connectivity options according to the invention is the provision of connectivity of the authenticator to one or more other verifiers to enable those other verifiers to authenticate the identity or membership in an authorized class of one or more parties to a communication transmitted and received in accordance with the invention. For example, if members of a professional body such as an organization of lawyers are subscribers to an Internet-based lawyer authentication system such as the Juricert system operating in Canada, connectivity between that system and the authenticator would enable the authenticator to verify the identity of a lawyer designated as the initiator of a message or responder thereto, without having the lawyer as a direct subscriber to the authenticator's service. Other connectivity options include a facility for connection to a general-purpose Internet-based accounting system and a distributor/reseller management system, a facility for connection to preferred messaging systems, and facilities for establishing URL links to providers of associated data and/or services.

Figure 2:
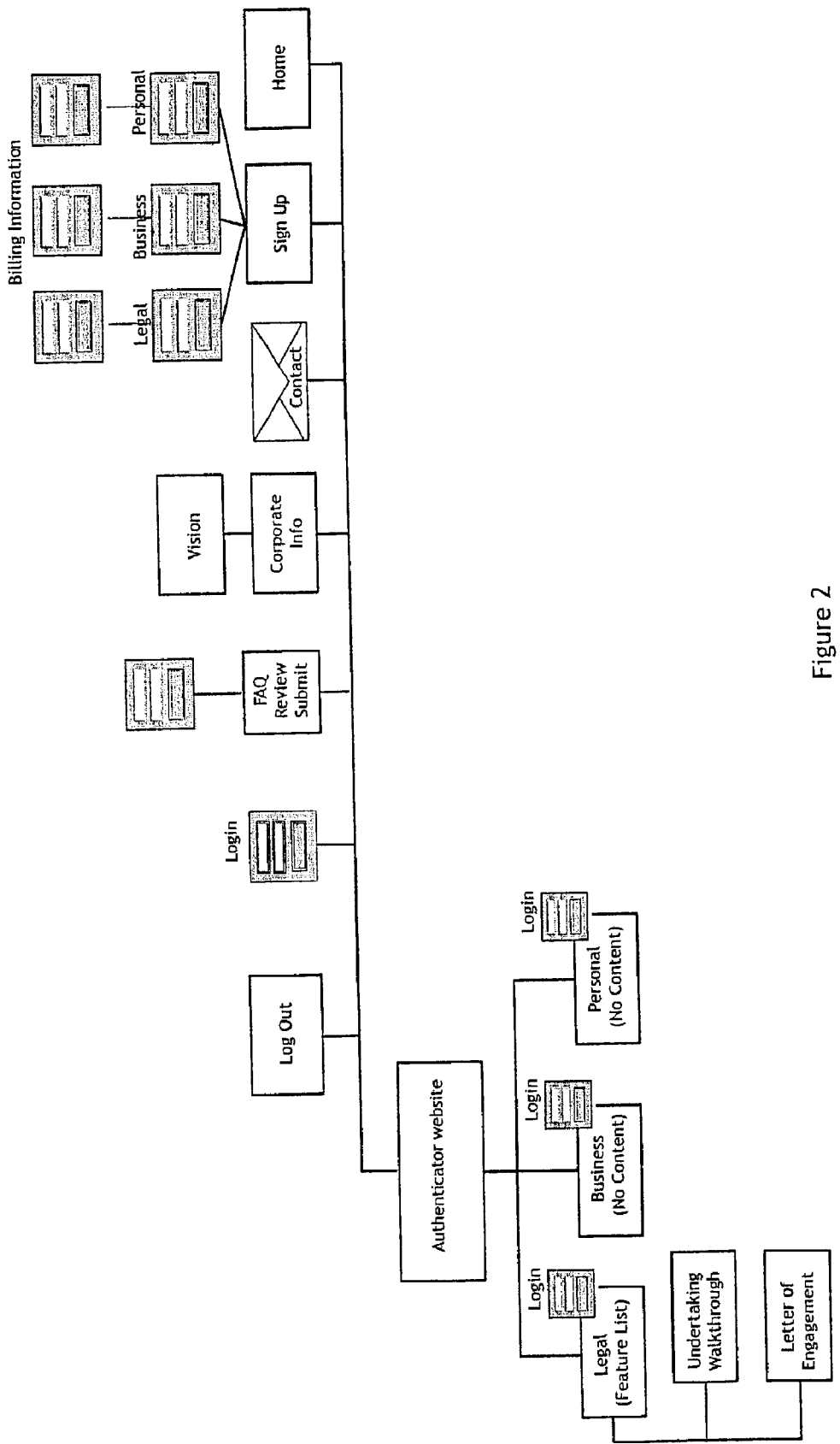
FIG. 2 is a schematic block diagram illustrating the connectivity between the authenticator's website and various users, and with an associated accounting facility, in accordance with a preferred implementation of the message verification system according to the invention.

FIG. 2 illustrates different types of access to limited portions of the authenticator website via the authenticator's web server in a representative preferred embodiment of the invention. Available to the public are the authenticator's home page, a facility for e-mail dispatch to the authenticator, information pages containing various informational data and answers to frequently asked questions, data input pages affording the opportunity to open an account with the authenticator, and of course the opportunity to log in. Once a subscriber has been accepted as such and is of record with the authenticator, the subscriber has separate log-in opportunities for initiating submission of a document and for access to the customer's account, and access to special features applicable to the class of subscriber. In FIG. 2, only three categories of subscriber (legal, business, personal) are identified by way of example, and of these, only the legal category is illustrated as having been offered any special service—here a "walk-through" or "tour" of the use of the undertaking submission, and options relative to the letter-of-engagement submission. However, it is easy to imagine other possible subscriber categories, types of document to be submitted, and associated services.

Figure 3:
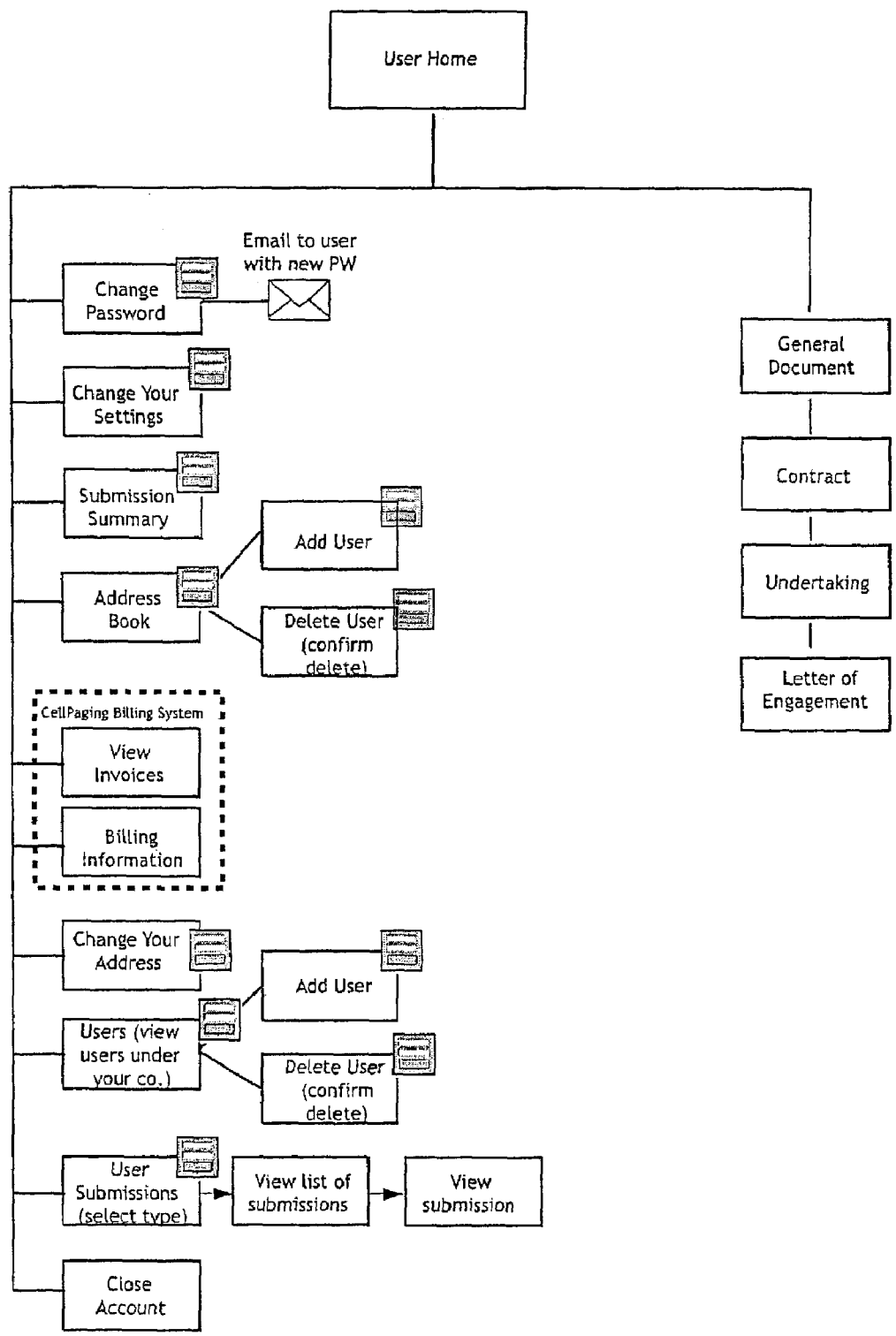
FIG. 3 is a schematic command option block diagram illustrating the command and viewing options available to a representative system subscriber pursuant to a preferred implementation of the message verification system according to the invention.

FIG. 3 illustrates a number of account data entry and viewing options available to the authenticator's subscribers. Apart from the functionality directly associated with the inventive system (document types, submission facility, etc.), many of the functions illustrated in FIGS. 2 and 3 (e.g., frequently-asked-questions (FAQ) methodology, password entry and change, address book, billing arrangements) would be available in many other previously known Internet-based systems. Alternatively, some of the subsystems described herein could be elected from proprietary systems available in the market.

Figure 4:
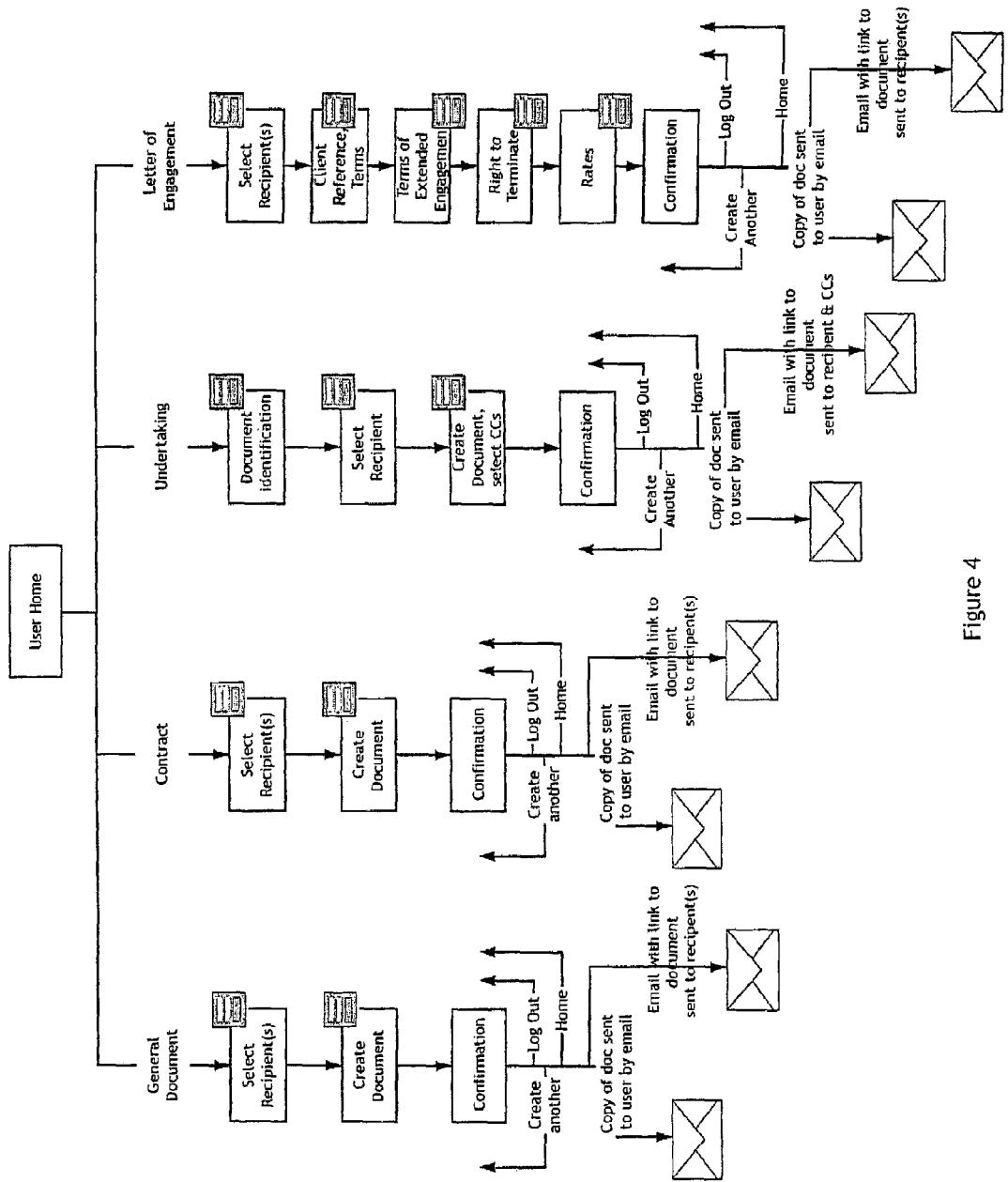
FIG. 4 is a schematic set of flowcharts illustrating the various document selection and creation options open to a representative system subscriber pursuant to a preferred implementation of the message verification system according to the invention, showing a representative sequence of operating steps for each of four possible document selections.

FIG. 4 illustrates four flow streams showing the sequence of steps required to submit each of the four exemplary categories of documents (general, contract, undertaking; engagement) described herein. Note that the Contract option as presented in FIG. 4 is identical to the General Document option. The overall concepts underlying each of the streams are considered novel per se, but the details can be varied to suit the designer and can be varied in response to the authenticator's subscribers' requirements. For example, each stream could be varied to include an additional preliminary step whereby the recipient is first asked to confirm either that the initiator is known to the recipient or that the recipient undertakes to learn as much about the initiator as is considered necessary by the recipient in order to proceed further with the negotiation. Or contract negotiations could be broken down by subject and by provision, and each exchange of messages could be limited to a specific provision or category of provisions, examples of such categories being quantity, price, delivery date, etc. Or it could be left up to the initiator and recipient to send out separately whatever notices they wish to CCs. And so forth. Other variants will readily occur to systems designers.

EXAMPLE

The following example is taken from the design of the service and website about to be launched by Datawitness Online Ltd. The website became operational shortly after the filing of the precursor U.S. provisional patent application that was superseded by the present application. Some optional aspects of the website design may differ from what is described in this specification, but any discrepancies are not critical to an understanding of the invention.

The general character of the service and website of Datawitness Online Ltd. is intended to be in substantial conformity with the preferred embodiment described above. However, there may be details that differ. It is to be understood that many of the detail design aspects of any particular implementation of the invention are within the discretion of the designer. Some of the more significant specifics of the expected Datawitness functionality will be described below.

The Create Function:

The create function is used for both the creation of a new document and the re-submission of a previously submitted document.

Different create scripts may be generated to create different types of document. For example, create scripts might include:
Create_general.php (used to create a general purpose document)
Create_undertaking.php (used to create an undertaking)
Create_engagement.php (used to create a letter of engagement)
Create_contract.php (used to create a contract)

As discussed previously, the first initiating step in launching a message exchange is the creation of a document. Initiators can select from a number of templates, depending on what type of account they hold as subscribers to the Datawitness service. There may be some variation in how documents are created, depending on the template selected.

From the user home page on the Datawitness website, the user (subscriber) is able to choose from a list of document templates which document type the user would like to create. The script create_document.php determines which form has been chosen and redirects the user to the appropriate script.

Document templates vary in content, but data entry may usefully follow the same general sequence, the user entering specific types of data in designated fields, each field displayed for data entry corresponding to a field in the Datawitness database. The series of data entry steps and associated commands to Datawitness may be as follows:
1. Identify the initiator's name and e-mail address.
2. Identify Recipient(s) and e-mail address(es).
3. Identify CCs (where applicable) and their respective e-mail addresses.
4. Provide document reference (subject/number).
5. Develop document content (note that in some cases this means simply creating or copying an existing document into a text box, in other cases it may mean completing fields within a standardized form, while in still other cases it may mean attaching documents).
6. Confirm to Datawitness that the document as created is satisfactory.
7. Submit the document. (Steps 6 and 7 may be combined.)
The Datawitness server then:
   1. Confirms the time and date of reception of the document from the initiator.
   2. Sends a confirmatory copy of the document to the initiator via e-mail.
   3. Sends an e-mail message to the recipient(s) containing a link to the document stored on the Datawitness server.
   4. Sends a copy of the document to CCs via e-mail, or else sends an e-mail message to the CCs containing a link to the document, and at the same time initiates archiving of the document (for example, by connectivity to a third-party archiving service).
   5. In most cases, the user can add any number of recipients to the document. The create document function allows for addition of new names, retrieval of names from an address book, and addition and deletion of names from an address book. In the case of some forms (the Undertaking form, for example), only one recipient can be added, but additional people can be CC'd on the document.

The user in creating a document sees initially a screen such as the representative computer monitor screen appearing in FIG. 5. At this stage, the PHP script is handling the following:
   1. Get Recipient Information—Get name and e-mail address of recipient to whom this will be sent (this information is entered in the "To" field by the user, and stored in the session data buffer until completion of the session).

(Note: When adding a recipient, the user has the option to add the recipient to the subscriber's address book. The user may click on the designated "address book" field to obtain a scrollable drop-down list of stored names and addresses of prospective recipients. If other recipients have been added previously, Datawitness will display them on-screen.)
   2. Determine the name and e-mail address of the initiator—Name and e-mail the registered user creating the document are retrieved from the USER data table.

When the user clicks "Add" or "Continue" the script effects the following:
   1. Validates Recipient—Ensures that a recipient's name and a valid e-mail address have both been provided for each entry in the "To" field.
   2. If upon the submit command, the name and e-mail have been left blank, and instead a recipient has been selected from the address book, Datawitness queries the database for the selected recipient from the data stored in ADDRESS_BOOK. If the selected recipient's e-mail address is the same as one of the e-mail addresses that the user has entered manually, reject one or the other entry or query the user.
   3. Process Recipient Deletions—If any recipients selected from ADDRESS_BOOK have their 'Delete' boxes checked, removes them from the session.

Next, the user views a second screen displayed by the Datawitness website, such as that appearing in FIG. 6. Using that screen, the next step in the document creation process is the entry of document details. The user, aided by the Datawitness script, effects the following steps:
1. Display initiator's name—the name and e-mail address of the initiator are retrieved from the stored USER data.
2. The document reference description is entered by the initiator.
3. Display recipient data (Recipient names and e-mail addresses, stored from data entered while the previous screen was in view)

4. One recipient must be designated the primary contact.
5. If the document is to be a resubmit document rather than an originating document, display the name of the person who disputed the originating document and the reason for the dispute. (This information is stored as a session variable.)
6. Details of the document (e.g., proposed terms of a contract) are entered by the initiator.
7. Upon the submit command, the Datawitness software effects the following:
8. Details are validated—Datawitness checks that all required fields were filled in.

With reference to FIG. 6, optional system architecture may include the following Datawitness software functionality:

9. Stores all data in database—Each template has its own master table, and its own master status table—for example, GENERAL_MASTER and GENERAL_MASTER_STATUS, are the tables used to store data regarding documents created using the General Document Template.
10. Once the MASTER has been updated, the date as recorded in the MASTER is selected as the submit date for the document.
11. An endorsement is added to the MASTER_STATUS table to confirm that the document data have been stored authentically by Datawitness.
12. Response records are created for the document, having fields that become completed when the respective recipients view the document and respond to it:
    a. master_id, name, e-mail, primary_contact are added to the RESPONSE table;
    b. response_id is added to the RESPONSE_STATUS table;
    c. parent and response id fields in the MASTER_STATUS table are set if the document creation process is to resubmit the document;
    d. submission list entry is created (Note: submission list is a master list of all documents that have been created);
    e. document data is added to the SUBMISSION_LIST table.

The designation "id" used above signifies a suitable identifier for the data in a given field.

Recipients receive an e-mail message such as the representative e-mail message in the screen capture of FIG. 7, which message includes a link to the document as stored in the Datawitness database. A plain full-text copy of the transmitted document is sent to the initiator by e-mail; a screen capture of a representative such e-mail message is shown in FIG. 8.

Notify Recipients:

Notification of recipients is effected by the web server software as follows:
1. Get sender information—initiator name and e-mail address are retrieved from the USER database.
2. The master id is encoded for creation of a URL link.
3. The name and e-mail address of the recipient(s) are retrieved from the RESPONSE table.
4. An e-mail message is generated using the retrieved data and a suitable template, and sent via e-mail to each designated recipient.

Note that CCs can be treated in much the same way as recipients pursuant to the methodology according to the invention; the significant and essential difference is that CCs would not normally be presented with a menu giving them the opportunity to accept, dispute, or request clarification of a submitted document.

Notify Initiator:
1. The initiator's name and e-mail address are retrieved from the USER database.
2. The names and e-mail addresses of the selected recipients are retrieved.
3. The pertinent document details are retrieved (Document date, Reference_description, message, endorsement) from the MASTER_STATUS data.
4. A selected suitable e-mail template is parsed and the e-mail message is saved.
5. The e-mail message including the saved retrieved data is sent to the initiator.

Update Submission Count:

The update_submission_count function permits an updating of the submission count for the initiator. Once the foregoing e-mail messages have been sent to the recipients, CCs and initiator, the submission count is updated—this function increases the number of submissions sent, as recorded in the USER database, by 1.

Display Confirmation:

A message submission confirmation display page confirming the date and time at which the submitted document was posted to the Datawitness database is created and presented to the user on the Datawitness website. A representative such display page is shown as a screen capture in FIG. 9. Note that a page menu in addition to the standard recurring left marginal and top menu options permits the user to create another document, return to the Datawitness home page, or log out.

Clean Up:

Once the session is complete, the Cleanup function enables the clearing from the active authenticator's interface of the session variables relating to the submitted document. This function and other conventional functions such as those relating to address book management, and the organization, entry and retrieval of data from databases, and similar such functionality, can be designed in accordance with previously known design methodology and criteria.

Create Undertaking:

It is possible to design and use a single generic document creation form, but some individuality of electronic document design may be preferable. FIGS. 10 to 12 illustrate a modification of the Create Document functionality that is designed for the creation and submission of an undertaking sought from the recipient; FIGS. 13 to 15 illustrate possible following screen sequences in the disposition of a request for undertaking.

FIG. 10 shows a screen capture diagram of the first screen of a submission web page suitable for creating an undertaking to be sought from a recipient. FIG. 11 is a screen capture diagram of the second screen of the submission web page of FIG. 10. FIG. 12 is a screen capture diagram of a modified view of the second screen of the submission web that is displayed when the initiator selects the address book option for identifying the recipient. The address book display portion of FIG. 12 may be presented to the user for other types of Create Document functionality as well.

In an exemplary simple design for the respond options to a submitted document, the recipient of such document has the option to Accept, Clarify or Dispute the received document. Other options are imaginable and could be added at the designer's discretion, such as Counterpropose, Defer, Edit (this last identifying general concurrence with the submitted document but a need to be precise about some details of the document). For the purposes of this discussion, it will be assumed that only the Accept, Clarify and Dispute response options are available to the responder. It is important to note that the response is not sent to the initiator; it is sent to the authenticator. This constraint allows the authenticator to maintain an updated record of the progress of the negotiation, and to verify at any later time the history of the negotiation. The parties to the negotiation learn of the progress of the negotiation through the authenticator. Of course they are at liberty to communicate with one another outside of the formal procedure established by the authenticator's software, but only the communications that occur through the authenticator can be verified later by the authenticator; knowledge of this fact will in most cases prompt at least one of the parties (typically the initiator) to insist that the entirety of the communications between the parties be effected through the authenticator.

When a recipient chooses to respond 'Accept' the following process occurs.

Accept:

A status flag in the associated RESPONSE_STATUS table is set to '1' (the "1" signifying that the document has become accepted).

Once a submitted document has been viewed by a recipient, the authenticator generates an endorsement. Note that because the authenticator has not sent the recipient the text of the document, but instead has sent to the recipient a brief message containing a URL link to the document at the authenticator's website, the recipient is forced to access the authenticator's website in order to view the document. Since that access occurs at the authenticator's website, the authenticator has the means to ascertain (i) that the recipient has viewed the document, and (ii) the date and time that the viewing occurred. Endorsement data are data generated by the authenticator and associated with the document that indicate as a minimum that the document was viewed and when the document was viewed. The endorsement may be expanded to include whether the responder accepted, disputed, or requested clarification of the document. The endorsement may be accompanied by text instructing the reader how to respond further. The endorsement can be automatically quickly generated and may appear to the recipient on-screen to alert the recipient to the fact that the initiator knows that the recipient has viewed the document.

In a typical minimum case, the initiator's name, responder's name, e-mail addresses, date/time original was viewed, date/time of response, are recorded and added as events occur to the RESPONSE_STATUS database as "Endorsement". This minimum data compilation can be expanded if the exchange of communications between the parties continues.

Update Master Status:
1. If all recipients of the document have responded, the status for the document itself is updated. In a typical minimum case, one of two principal alternative results will have been reached:
2. If all recipients have accepted the document, mark the master record for the document as accepted.
3. If any recipient has disputed it, mark the master record as disputed On a routine or triggered update, the authenticator software retrieves the status of the document from the data table RESPONSE, field RESPONSE_STATUS. If the status is 'UNREAD' (at least one recipient has not read the document), the authenticator does not update the master record status. If the status is 'DISPUTED', there is at least one dispute, so the authenticator marks the master record disputed, and updates the submission list accordingly. In that event the updates are as follows:
Update MASTER_STATUS; set 'status' equal to 'Dispute'.
Update SUBMISSION_LIST; set 'processed' to '1', 'hidden' to '0'.

If there is no dispute, every recipient has accepted the submitted document, so mark the master record 'accepted', and update the submission list accordingly. In that event the updates are as follows:
Update MASTER_STATUS, set 'status' to 'Accept'.
Update SUBMISSION_LIST, set 'processed' to '1' and 'hidden' to '0'.

Send Status Notification:

The status notification message is sent once the status of the submitted document has been established by the updating process described above. This notification message is created by retrieving the sender's name and e-mail address, document date, reference description, message, endorsement, recipient's name and e-mail address from the data tables MASTER, RESPONSE, RESPONSE_STATUS, and USER. The authenticator parses a suitable template and saves the resulting message. The authenticator then sends the status notification message by e-mail to all parties. A representative such message for an accepted undertaking is shown as the screen capture of FIG. 13.

Dispute:

A submitted document is deemed to have the status 'disputed' if any recipient has disputed the document. The authenticator in that event enters the status of the document as disputed and notifies the parties of the dispute. The initiator upon notification of the dispute is given the option to resubmit the document. A representative such notification appears in FIG. 14. The other parties are given a similar notification but without the option of resubmitting the document; a representative such notification appears in FIG. 15. The updating of the master record is effected in much the same way as for an acceptance, but with the appropriate fields given values correlatable with a dispute. Note that an additional data field comes into play in the event of a dispute, viz 'Reasons for dispute', which field is accessible by the responder for data input when the responder elects the 'Dispute' response option. The authenticator's software may if so desired be set to require at least some minimum data entry into the 'Reasons for dispute' field in order to ensure that the responder has been made to understand that the responder is at liberty to enter text reflecting the responder's reasons for disputing the document.

Note that one recipient may have disputed a submitted document while another may have requested clarification. In that event, the status of the document is 'Disputed', but the request for clarification is notwithstanding communicated to the initiator.

Record Dispute:

The authenticator script arranges an update of the RESPONSE table to show the RESPONSE_STATUS as 'Dispute' and to enter the 'Reasons for dispute' data to the RESPONSE table. The authenticator's endorsement is similarly updated. The endorsement can later be used for evidentiary purposes, so preferably includes certain specified 'tombstone' data such as the following, for each dispute of record:

| | | |
|---|---|---|
| a. | | Initiator's and Recipient's names |
| b. | | Initiator's and Recipient's e-mail addresses |
| c. | | Document type |
| d. | | Document Description |
| e. | | Date and time original document submitted |
| f. | | Document dispute recorded |
| g. | | Date and time dispute communicated |

If desired, the endorsement could include the reasons given for the dispute, but as such might be prolix, the reasons might preferably be omitted from the endorsement and in that event the endorsement could be tagged "Reasons for dispute of record" or "No reasons stated for dispute", if the latter option is permitted.

The manner of notification of parties, updating of master record, display of confirmation of disputed status, etc. can be essentially similar to what has been described above relative to the Accept functionality, mutatis mutandis. A representative status display page for use in the event of a dispute, for access by the responder, appears in FIG. 16. The content and presentation of the display page may vary by category of party. For example, the initiator might be able to reach a display page that in addition to the content of the notice of FIG. 16 displays the expressed reasons for the dispute.

Periodically or upon demand by the initiator or both, Datawitness provides a summary of outstanding submissions with an indication of status, such as 'Not Viewed' 'Accepted', 'Disputed', etc. A representative submission summary sent by Datawitness by e-mail to the initiator may appear as presented in FIG. 17, for example.

Resend:

When a document initiator accesses the initiator's subscriber account and notes the absence of an acknowledgment of reception of a submitted document by a recipient, or if the initiator receives a submission summary by e-mail that reveals that the submission has not been viewed by a recipient, then a link to the submission is provided by Datawitness, allowing the initiator to link back into the document and resend it to the same recipient, either to the same e-mail address or to a different e-mail address. In the Datawitness system, the only data that the initiator is able to change relative to the submission is the recipient's e-mail address. If any further change is desired, the initiator may generate a new document for a fresh submission.

If the initiator in such circumstances elects to resend, a dialog box such as that appearing in FIG. 18 appears on the Datawitness website for limited data entry by the initiator. In the example given, data entry is limited to the recipient's e-mail address.

Datawitness optionally checks before permitting a resend to determine if the recipient has viewed the submitted document (the recipient may conceivably have viewed the document in the time between the initiator's receipt of the submission summary, and initiator's clicking the resend option). In the Datawitness system, only documents that have not yet been viewed by the recipient can be resent.

The details of the resend routine, including checking the e-mail address for compliance with standard address requirements, retrieving the relevant data from the Datawitness database that were entered previously when the original document was submitted, etc. are either analogous to what has previously been described or conventional in character. Once the document has been resent, a resent notification display page is created by Datawitness for access at its website to the initiator, an example of such page being illustrated in FIG. 19.

Resubmit:

The Resubmit functionality is used when recipient of a submitted document by response disputes a document or requires its clarification, and the initiator elects to submit the document or a revised version or a substitute document to the recipient once again. Note that if a substitute document is to be submitted, the initiator has the option of treating it as a fresh document and submitting it as a second originating document. The initiator may be expected to choose which of these alternative approaches (resubmit substitute document, or submit second document as a fresh original submission) is preferred depending upon whether the entire sequence is to be treated as a single negotiation or whether the initiator would instead prefer to appear to be taking a fresh start. The authenticator can if it wishes choose to bill separately for each resubmission; Datawitness may elect to do so. Absent any change entered to vary the recipients or CCs, all recipients and CCs of the original document are provided by e-mail with links to the resubmitted document (or optionally for CCs, full text of the resubmitted document), regardless of whether they accepted or disputed the original.

The Resubmit functionality can be quite similar to the Create Document functionality. In addition to the latter, the Resubmit functionality may, whenever a user initiator logs in, ascertain whether an original document initiated by that user has been disputed, and if it has, may offer the user the Resubmit option as a default rather than offering the Create Document default. If the user elects the Resubmit option, the related particulars for the original submission are retrieved from the related databases and serve as default data entries for the document to be resubmitted.

Read:

The 'Read' scripts (read_undertaking.php, read_general. php, etc.) display on the Datawitness website data pertaining to a document specified in an e-mail notification sent to a recipient.

Specifically, the scripts complete the following actions:

1. Display the document details, and appropriate click-on buttons for the recipient to accept, dispute, clarify, etc.
2. Display Confirm accept/dispute/clarify page, as required.
3. Call accept/dispute/clarify scripts as required based on recipient action.

FIG. 20 shows a representative e-mail message containing a URL to a document to be viewed by a recipient (as shown in the screen capture of FIG. 20). In the Datawitness system, the URL is created according to the following scheme:

https://www.datawitness.net/read_documenttype.php/documentID/timerecorded

The document ID and the time recorded are retrieved from the MASTER file.

Get Undertaking Details

The Datawitness scripts enable a reading of the undertaking information from the SQL database and complete the following series of routines.

1. The system marks 'undertaking' (say) as 'viewed'.
   a. Update MASTER_STATUS, set 'viewed' to '1', and 'time viewed' to the current time.
2. The document data (client reference, date, recipient name, recipient e-mail address, nature, description, endorsement, other names, other e-mail addresses, status, etc.) is retrieved from MASTER, MASTER_STATUS, USER.
3. The system inserts data from its query into a suitable selected HTML template.
4. The system builds list of addressees CC'd on the document (if the template being used permits CCs).
5. If there has already been a response, the form on the template is hidden, and the response is shown instead (see, for example, the Datawitness display page whose upper and lower portions are respectively shown in the screen captures of FIGS. 21A and 21B).
   a. Status and date are selected from RESPONSE and RESPONSE_STATUS. If a response has been noted on the document, the system displays the date and response.

Get Recipient List

In this aspect of the Read function, the script creates a list of recipients for the current document.
1. Name, email and status are selected from RESPONSE, RESPONSE_STATUS.
2. For each recipient, the system confirms whether the recipient is currently viewing the document, has not responded, has accepted/disputed/clarified.
3. The system prepares a list of recipients, including name, e-mail address, and response of each.

The system creates a Display Page for viewing of the foregoing data by an intended recipient. A representative Display Page for a representative submitted undertaking appears in two successive screen captures as shown in FIGS. 23A and 23B.

Get CC List

The Read script creates list of addressees to be CC'd (if any) on the submission. This involves performance of the following progression of steps:
1. See if there are any CC's.
   a. Select count(ID) from CC file
2. If there are CC's, get the data:
   a. Select name, email from CC
3. If there are no CC's, clear the dynamic CC list.

Confirm Action

Have the recipient as responder verify the selected action. This involves the following progression:
1. If action='accept', response is passed as 'accept and agree with'.
2. If action='clarify', response is passed as 'require clarification of, or have correction to,
3. If action='dispute', response is passed as 'disagree with the terms of'

Following the responder's viewing of the submission, the responder is presented with a confirmation display page relating to the submission. A representative such page is shown in the screen capture diagram of FIG. 24.

Submission Summary:

The Datawitness script checks for unanswered submissions and e-mails the initiator, based on a pre-determined schedule; alternatively, the initiator could from time to time check the status of currently active submissions on the Datawitness website. The functionality includes the following:
1. Report submissions that haven't received a response in x days.
2. Allow submissions that are at least x days old to be resubmitted, where the value 'x' is determined by the system operator.
3. Allow submissions that are at least y days old to be hidden, where the value 'y' is determined by the system operator.
4. Select user ID, e-mail address and name from SUBMISSION_LIST, USER, for any submissions that have not yet been processed, are not hidden, and are older than x days.
5. For each initiator with outstanding submissions:
6. Prepare e-mail message:
   i. Insert Initiator's name
   ii. Get list of all outstanding documents for each initiator from SUBMISSION_LIST
   iii. Examine each entry to determine what type it is (for example, if submission_table=undertaking_master, it is an undertaking).
   iv. List outstanding submissions in e-mail body (from subroutines such as: list_undertakings, list_engagements, list_general, and list_other)
7. Send each message using, for example, $MailProgram
8. As mentioned, the subroutines used in performance of the foregoing include, for example List_undertakings, List_engagements, List_general, and List_other. By way of example, the subroutine list_undertakings performs the following steps:
9. Titles section of the e-mail template "Undertakings".
10. Selects submission id, today's date, and submitted date from SUBMISSION_LIST for all undertakings listed that are not yet processed and are older then the set age limit.
11. Retrieves information on each undertaking—selects date, recipient name, e-mail address, description, status (viewed/not viewed) from UNDERTAKING_MASTER, UNDERTAKING_MASTER_STATUS.
12. Orders the list in sequence according to recorded date.
13. Determines whether the submission is old enough to resend. If it is, makes resend link.
14. Determines whether submission is old enough to include the hide function. If it is, makes hide link.

The other subroutines perform in an analogous manner to that summarized above. Once the subroutine has been completed, a reporting submissions summary e-mail message is sent to the initiator subscriber, an exemplary such e-mail message being shown in the screen capture diagram of FIG. 22.

Submission Summary:

The first script described, submission_summary.php is accessible from the Datawitness subscriber's home page, is accessed by clicking on "Submission Summary" on the menu bar, and creates a drop-down list of all document types the user has created, both outstanding and completed. Once the user selects the document type from the menu (see screen capture below), a paginated list, system-generated by general_summary.php, contract_summary.php, etc., reveals the documents created by the user (as initiator) within the document type selected.

With reference to FIG. 25, the script displays a drop-down menu of types of documents the user has created—sorted by outstanding and completed. The incipient drop-down menu appears in the screen capture of FIG. 25.

The script accesses the following templates:
Submission_summary.html
User_template.html
Copyright.html
Internalheading.html "documents" and "body" are dynamically defined.

The following actions, included in the script must be performed before the final call to 'parse', they are not primary functions of the script.

Determine if user is an administrator and retrieve the user's name

Select admin, name, add_users from CLIENT, USER

Display the user's name, hide administrative links from non-administrators and user link from accounts that can't add users Based on the type of document the user selects from the drop-down menu, the script determines what summary script to call next If the user chooses "Outstanding Contracts", the document type pulled from the database is "contract". The script takes this variable, and adds "_summary.php" to obtain the Contracts summary page "contracts_summary.php Display Menu
Function display_menu This function displays a drop-down select list of available document types for the user to view. Note that the list is limited to document types that the user has previously created.

Select distinct submission_table, processed from SUBMISSION_LIST, for the current user
Order documents by whether or not they have been completed, the document type, and the date submitted
Order by: processed, submission_table, submitted, submission ID If records exist:
Select title from documents
If the document has not been processed, title "Outstanding"
If the document has been processed, title "Completed"
Add rest of title based on document type.
Assign array "document_type", "processed", "title"
Display Page (as shown in the specimen screen capture on page 1)
"Document Type" Submission Summaries Each document type currently has a separate script for display of a list of documents that a user has created. These include:
Undertaking_summary.php
General_summary.php
Engagement_summary.php
Contract_summary.php These scripts perform essentially the same functions, with the exception of the types of documents they list, and slight variations in what they display. The screen captures at the end of this document indicate these slight variations.

Build Page List
Function build_page_list

This function builds a list of paginated links.

Determine the total number of pages that will be required, but, using SUBMISSION_LIST, documenttype_MASTER, divide the total number of submissions by the number of records to be displayed per page.

If displaying processed documents, display only the top level (those that have no parent and/or are the parent).
Create pagination Build Table
Function build_table Get list of selected document type for the current user. The 'processed' variable determines whether documents to be displayed are completed or outstanding.

Select submission_id, submission_table, hidden from SUBMISSION_LIST, documenttype_MASTER where—the submission list ID matches the user's ID, submission_table equals the documenttype MASTER and the document is either complete or outstanding (depending what document type was selected).
Begin numbering items, starting with 1.
If displaying processed documents, display only those where parent=0.
Order by submitted description
Limit number per page
Select description or file reference, date of discussion, recipient name, date recorded from documenttype_MASTER.
Assign an array, including:
ID
Description
Discussion Date
Recipient Name
Recorded
Processed
Rec_no (number in list)
If a document is currently "hidden", display "unhide submission" link.
Display page The screen capture of FIG. 26 lists General Documents.

The screen capture of FIG. 27 lists Letters of Engagement. Unlike the other summary lists, Letters of Engagement are listed by a file reference rather than by document description. (Note that both the file reference and document description are created by the document initiator).

The screen capture of FIG. 28 lists Undertakings.

The screen capture of FIG. 29 lists Contracts.

Hide and Unhide Functions

The hide and unhide functions relate to the submission summary e-mail controlled by crontab.responsecheck.

Based on the age of a document appearing in a submission summary e-mail notice, the user may be provided with a link that allows the user to "hide" the document, meaning that the document will not appear as reported in the submission summary e-mail report to the initiator until such a time as the user "unhides" it.

The screen capture of FIG. 30 shows a submission summary email with option to 'hide' either document listed (Click "URL" to remove from this list):

Hide Submission

Templates associated with this action include:
Done—hide_submission_done.html
Main user_template.html Based on a code URL provided in the submission summary email, which defines both the MASTER_TABLE related to the submission and the coded ID of the document, the hide function updates SUBMISSION_LIST, setting 'hidden' to '1'. The hide function then calls a web page confirming that the submission has been hidden. (see screen capture of FIG. 31).

Unhide Submission

The unhide submission script, unhide_submission.php, clears the 'hidden' flag on a selected submission so that it will appear on the daily submission summary email. It then returns the user to the display that called the function. Displays that may call this function include the document type submission summary lists, including general_summary.php, undertaking_summary.php, etc.

Unhide performs the following function:

When a user clicks the "Restore to Daily Email" link next to a document listed on a submission summary page (as shown in the screen capture of FIG. 32), the script updates SUBMISSION_LIST, setting hidden to 0 for the selected document.

The script then refreshes the user to the page previously in view, with the 'Restore to Daily Email' link removed (as shown in FIG. 33).

Submission Search

The submission search allows users to search for submissions. Using conventional techniques with the aid of the present discussion, the system can be expanded to allow for other search variables. The search result screen shows submission type, recipient name, date submitted, and description, and allows the searcher to access each document that the search returns.

With reference to FIG. 34 and FIG. 35, the search function is designed to search the RESPONSE tables associated with all document types, for the recipient name. Search results pull information regarding the returned document(s) from MASTER tables associated with each document type.

The following defines actions of the script, based on variables passed in the subsequent functions.
1. Checks admin, name, add_users from USER to see if user is an administrator, if not, hide administration links and user link from accounts that can't add users.
2. Controls flow:
   a. If the user is returning from a 'detail' display, redo search, build page list, display results
   b. Otherwise, display search results
      i. If the search returns items, display them
      ii. If not, return "No matching records found"
      iii. Build search form
   c. If variable 'paging' is returned, use pagination links
      i. Perform search
      ii. Build page list
      iii. Display results
      iv. Build search form
   d. If variable 'cancel' is returned, cancel search
   e. Otherwise, this is the initial display
      i. Unregister search parameters
      ii. Build search form
3. Parse, display page Build Search Form
Function build_search_form
This function builds drop-downs for submission type and date by selecting mastertable, title from DOCUMENTS where account type is "0" or account type matches current account type, and the account is active Build Date Dropdown
Function build_date_dropdowns
This function builds start date/end date drop downs for search. Start date defaults to date of earliest submission for the current user; end date defaults to date of latest submission. If the user has no submissions, search results return "You have no submissions"

Check Form
Function check_form
This function checks the search form to ensure it is filled out correctly. (Dates must be valid, and the selected start date must be before the selected end date).

Register Search Parameters
Function register_search_parameters
This function stores search parameters in session variables so they can be restored when the user returns to the search page after viewing documents.

Submission, recipient, start_month, start_day, start_year, end_Month, end_day, end_year and calling_page (submission_search.php) are all stored as GLOBAL session variables. *_detail.php script uses the calling_page variable to return to the search page.

Perform Search
Function perform_search
This function creates a list of submissions that meet search criteria and returns list of ID's from SUBMISSION_LIST.
1. Format form date drop downs into start and end dates (YYY-MM-DD) for SQL database query.
2. Select ID from SUBMISSION_LIST
   a. If the user has not selected "all" document types
      i. Select files from submission list that match the document type selected, and whose submitted dates fall within the submitted date range selected
      ii. Order by submission table, ID
      iii. List
   b. If a recipient was entered, perform function recipient_search Recipient Search
Function recipient_search
This function removes submissions not sent to the selected recipient from the resulting submission list.

Build Page List
Function build_page_list
This function builds a list of pagination links.
1. Determine the total number of pages that will be required, by dividing the total number of submissions (as counted in SUBMISSION_LIST, documenttype_MASTER) by the number of records to be displayed per page.
2. If displaying processed documents, display only the top level (those that have no parent and/or are the parent).
3. Create pagination Display Results
Function display_results
This function shows the results of the search.
1. Select submission_table, submission_id, date submitted for items retrieved in the search, and that fall into the selected document type category.
2. Order by submission_table, and submission_id
3. Limit records per page
4. Fetch results stored in Global variables
5. Get Description (Note: description field is dependent upon what the submission master table is—what document type it is)
   a. If the document is an Engagement, the description is 'file-reference'
   b. If the document is an undertaking, the description is 'description'
   c. Otherwise, the description is 'reference-description'
6. Get the name of the script to view submission
   a. In the appropriate "*_detail.php" script required to view a selected document is determined by selecting the document type and appending it to "_detail.php".
7. Assign an array:
   a. Submission Type (title)
   b. Rec_no (record number)
   c. Description
   d. Recorded
   e. Recipients
   f. Date_Submitted
   g. Detail_Script
   h. ID
8. Parse—Display Unregister Search Parameters
Function unregister_search_parameters
This function clears session variables that tracked the search.

Submission Summary Details
This section summarizes some of the procedures for establishing and displaying the details of a selected document for presentation in a submission summary page.

The following scripts are a called from the submission summary pages, including:
General_summary.php
Undertaking_summary.php
Engagement_summary.php
Contract_summary.php The role of the "Detail" scripts is to display the details of a document selected. There are presently 4 detail scripts in the Datawitness system, each of which handle display of a given document type. New "Detail" scripts will be developed as new templates are created. Current scripts include:
General_detail.php
Undertaking_detail.php
Engagement_detail.php
Contract_detail.php In general, these scripts perform the following functions:
Queries the database to retrieve the appropriate details for the given document
Details (such as sender name, document date, reference description, etc.) are retrieved from USER table and appropriate MASTER table.
Check whether this is a resubmission of an earlier document. If it is, create a link to that document.

Detail General
Queries the database to get the appropriate details for given document. Displays the details of selected general purpose document.

Get Details
Function get_details
This function retrieves the content of the selected general document and stores it in an array for display.
1. Select sender_name, document_date, reference_descriptions, message, master_recorded, userid from USER and GENERAL_MASTER.
2. Make return from database an array. (Store it for later display).

Locate Parent
Function locate_parent
This function checks to see whether this is a resubmission of an earlier document. If it is, a link is created to that document.
1. Select parent_id and parent_description from GENERAL_MASTER and GENERAL_MASTER_STATUS where the general_master_id matches the id of the document being retrieved, and the document's id matches the parent id.
2. If there is a matching parent ID, the parent id and parent reference description are stored in an array.

Get Recipient List
Function get_recipient_list
This function gets a list of people who receive this document.
Select name, email from GENERAL_RESPONSE where the general master id, matches the id of the selected document.
For each name & email pair retrieved, save as an array of "name" and "email"
Parse "Recipients"

Get Originator Endorsement
Function get_originator_endorsement
This function gets the endorsement from initial submission.
Select endorsement for the selected document from GENERAL_MASTER_STATUS.
Assign the return "Master_Endorsement"

Get Response
Function get_response
Get the recipient's response to the document. If they responded, get endorsement.
1. Select recipient ID, name, status, viewed, date (time viewed) from GENERAL_RESPONSE, GENERAL_RESPONSE_STATUS.
2. For each recipient returned, store as table data:
   a. Recipient
   b. Time Viewed
   c. Recipient Endorsement
   d. Time Accepted
   e. Time Disputed
   f. Now
   g. Dispute Reason
3. Determine for each if the document has been viewed, and if so, what the status is:
   a. If the 'viewed' field is blank, the document has not been viewed. Assign an array: Now (current date), Recipient (name)
   b. If the document has been viewed, but the status field is blank, the document has been viewed, but not responded to. Assign an array: Time Viewed, Recipient (name)
   c. If the status field is "Accepted", this recipient has accepted the document. Report time the response was recorded assign an array: Time accepted, Recipient Endorsement, Recipient.
   d. If none of the above is true, the document has been rejected. Assign an array: Time Dispute, Dispute Reason, Recipient, Recipient Endorsement.

Locate Child
Function locate_child
If this document was resubmitted, create a link to the recipient's dispute of the given document.
1. For each recipient, Select ID, reference description from GENERAL_MASTER, GENERAL_MASTER_STATUS
2. If a child document exists, create an array: Child ID, Child Description Contract Detail
Contract detail display details of the selected contract. Note that it functions exactly the same as General Detail, with the exception of which "MASTER" and "MASTER_STATUS" tables it queries.

Get Details
Function get_details
This function retrieves the content of the selected contract document and stores it in an array for display.
3. Select sender_name, document_date, reference_descriptions, message, master_recorded, userid from USER and CONTRACT_MASTER.
4. Make return from database an array. (Store it for later display).

Locate Parent
Function locate_parent
This function checks to see whether this is a resubmission of an earlier document. If it is, a link is created to that document.
1. Select parent-id and parent-description from CONTRACT_MASTER and CONTRACT_MASTER_STATUS where the general_master_id matches the id of the document being retrieved, and the document's id matches the parent id.

2. If there is a matching parent ID, the parent id and parent reference description are stored in an array.

Get Recipient List
Function get_recipient_list
This function gets a list of people who receive this document.
Select name, email from CONTRACT_RESPONSE where the general master id, matches the id of the selected document.
For each name & email pair retrieved, save as an array of "name" and "email"
Parse "Recipients".

Get Originator Endorsement
Function get_originator_endorsement
This function gets the endorsement from initial submission.
1. Select endorsement for the selected document from CONTRACT_MASTER_STATUS.
2. Assign the return "Master_Endorsement"

Get Response
Function get_response
Get the recipient's response to the document. If they responded, get endorsement.
1. Select recipient ID, name, status, viewed, date (time viewed) from CONTRACT_RESPONSE, CONTRACT_RESPONSE_STATUS.
2. For each recipient returned, store as table data:
   a. Recipient
   b. Time Viewed
   c. Recipient Endorsement
   d. Time Accepted
   e. Time Disputed
   f. Now
   g. Dispute Reason
3. Determine for each if the document has been viewed, and if so, what the status is:
   a. If the 'viewed' field is blank, the document has not been viewed. Assign an array: Now (current date), Recipient (name)
   b. If the document has been viewed, but the status field is blank, the document has been viewed, but not responded to. Assign an array: Time Viewed, Recipient (name)
   c. If the status field is "Accepted", this recipient has accepted the document. Report time the response was recorded—assign an array: Time accepted, Recipient Endorsement, Recipient.
   d. If none of the above is true, the document has been rejected. Assign an array: Time Dispute, Dispute Reason, Recipient, Recipient Endorsement.

Locate Child
Function locate_child
If this document was resubmitted, create a link to the recipient's dispute of the given document.
1. For each recipient, Select ID, reference description from GENERAL_MASTER, GENERAL_MASTER_STATUS
2. If a child document exists, create an array: Child ID, Child Description.

Undertaking Detail
This script displays details of the selected undertaking. The process is very similar to the General Detail and Contract Detail listed above, with the following exceptions:

Retrieves document identification separate from other document information
Retrieves and Displays CC's (Note: on an undertaking there can be only one recipient, but the initiator has the option to CC other people who should see the document).

Get Identification
Function get_identification
This function retrieves identifying fields, including: undertaking date, client reference, nature, description etc.
1. Select undertaking_date, client_reference, nature, description, master_recorded, parent from UNDERTAKING_MASTER
2. Assign array: Undertaking date, client reference, nature, description, master-recorded Locate Parent
Function locate_parent
This function checks to see whether this is a resubmission of an earlier document. If it is, a link is created to that document.
1. Select parent_id and parent_description from UNDERTAKING_MASTER and UNDERTAKING_MASTER_STATUS where the general_master_id matches the id of the document being retrieved, and the document's id matches the parent id.
2. If there is a matching parent ID, the parent id and parent reference description are stored in an array.

Get Details
Function get_details
This function retrieves the names of the initiating lawyer and recipient, and details of undertakings.
1. Select name of initiator, recipient's name, initiator's undertaking and recipient's undertaking from USER and UNDERTAKING_MASTER.
2. Assign array: Initiator, Recipient, Initiator Undertaking, Recipient Undertaking Get CC List
Function get_cc_list
Get list of people who were sent cc's of this undertaking.
1. See if there are any CC's
   a. Select count(id) from UNDERTAKING_CC for the selected document
2. If there are CC's, select name, email from UNDERTAKING_CC, for each person CC'd
   a. Assign an array: CC_Name, CC_Email
3. If there are no CC's, clear the dynamic 'CC' (so that it doesn't appear in template), assign an array: No_CC 'No CC's were sent'

Get Originator Endorsement
Function get_originator_endorsement
This function gets the endorsement from initial submission.
1. Select endorsement for the selected document from UNDERTAKING_MASTER_STATUS.
Assign the return "Master_Endorsement"

Get Response
Function get_response
Get the recipient's response to the document. If they responded, get endorsement.
1. Select recipient ID, name, status, viewed, date (time viewed) from UNDERTAKING_RESPONSE, UNDERTAKING_RESPONSE_STATUS.
2. For each recipient returned, store as table data:
   a. Recipient
   b. Time Viewed c. Recipient Endorsement
    d. Time Accepted
    e. Time Disputed
    f. Now
    g. Dispute Reason
  3. Determine for each if the document has been viewed, and if so, what the status is:
    a. If the 'viewed' field is blank, the document has not been viewed. Assign an array: Now (current date), Recipient (name)
    b. If the document has been viewed, but the status field is blank, the document has been viewed, but not responded to. Assign an array: Time Viewed, Recipient (name)
    c. If the status field is "Accepted", this recipient has accepted the document. Report time the response was recorded—assign an array: Time accepted, Recipient Endorsement, Recipient.
    d. If none of the above is true, the document has been rejected. Assign an array: Time Dispute, Dispute Reason, Recipient, Recipient Endorsement.

Locate Child
Function locate_child
  If this document was resubmitted, create a link to the recipient's dispute of the given document.
  1. For each recipient, Select ID, reference description from UNDERTAKING_MASTER, UNDERTAKING_MASTER_STATUS
  If a child document exists, create an array: Child ID, Child Description Engagement Detail
  This script display details of a selected engagement. The script functions the same as the general detail and contract detail scripts described above, with the exception of the MASTER and MASTER_STATUS tables queried.

Get Details
Function get_details
  This function retrieves the content of the selected engagement document and stores it in an array for display.
  1. Select sender_name, document_date, reference_descriptions, message, master_recorded, userid from USER and ENGAGEMENT_MASTER.
  2. Make return from database an array. (Store it for later display).

Locate Parent
Function locate_parent
  This function checks to see whether this is a resubmission of an earlier document. If it is, a link is created to that document.
  1. Select parent_id and parent_description from ENGAGEMENT_MASTER and ENGAGEMENT_MASTER_STATUS where the engagement_master_id matches the id of the document being retrieved, and the document's id matches the parent id.
  2. If there is a matching parent ID, the parent id and parent reference description are stored in an array.

Get Recipient List
Function get_recipient_list
  This function gets a list of people who receive this document.
  Select name, email from ENGAGEMENT_RESPONSE where the general master id, matches the id of the selected document.

For each name & email pair retrieved, save as an array of "name" and "email"
  Parse "Recipients"

Get Originator Endorsement
Function get_originator_endorsement
  This function gets the endorsement from initial submission.
  Select endorsement for the selected document from ENGAGEMENT_MASTER_STATUS.
  Assign the return "Master_Endorsement"

Get Response
Function get_response
  Get the recipient's response to the document. If they responded, get endorsement.
  1. Select recipient ID, name, status, viewed, date (time viewed) from ENGAGEMENT_RESPONSE, ENGAGEMENT_RESPONSE_STATUS.
  2. For each recipient returned, store as table data:
    a. Recipient
    b. Time Viewed
    c. Recipient Endorsement
    d. Time Accepted
    e. Time Disputed
    f. Now
    g. Dispute Reason
  3. Determine for each if the document has been viewed, and if so, what the status is:
    a. If the 'viewed' field is blank, the document has not been viewed. Assign an array: Now (current date), Recipient (name)
    b. If the document has been viewed, but the status field is blank, the document has been viewed, but not responded to. Assign an array: Time Viewed, Recipient (name)
    c. If the status field is "Accepted", this recipient has accepted the document. Report time the response was recorded—assign an array: Time accepted, Recipient Endorsement, Recipient.
    d. If none of the above is true, the document has been rejected. Assign an array: Time Dispute, Dispute Reason, Recipient, Recipient Endorsement.

Locate Child
Function locate_child
  If this document was resubmitted, create a link to the recipient's dispute of the given document.
  1. For each recipient, Select ID, reference description from ENGAGEMENT_MASTER, ENGAGEMENT_MASTER_STATUS
  2. If a child document exists, create an array: Child ID, Child Description The screen captures of FIG. 36 and FIG. 37 show a page generated by detail_general.php.

In view of the wide variety of embodiments to which the principles of the invention can be applied, it should be apparent that the detailed embodiments are illustrative only and should not be taken as limiting the scope of the invention. Rather, the claimed invention includes all such modifications as may come within the scope of the following claims and equivalents thereto.

What is claimed is:
  1. A network-based system for providing verification of a series of messages exchanged between at least a sender station and a recipient station of the network, said system comprising an authenticator for:

i. routing, authenticating and storing at least three related identifiable telecommunicated messages in said series of messages exchanged between the sender station and the recipient station;
ii. authenticating said recipient station, and classifying the recipient station's response to an originating message in said series of messages, said response being selected at the recipient station from a group comprising at least (a) acceptance and rejection of the originating message, (b) response to a question in the originating message; and (c) response to an offer or option included in the originating message;
iii. alerting the sender station to the receipt of the recipient's response to the originating message;
iv. generating and maintaining a unique message record for the series, including the originating message and of all subsequent messages in the series;
v. providing an authentic record of an agreement reached and defined by the series of messages; and
vi. authenticating said sender station, and determining membership of a sender associated with said sender station and a recipient associated with said recipient station in an authorized class of parties to said messages, prior to routing said message to said recipient station.

2. A system as defined in claim 1, wherein the group from which said response is selected also includes: (d) an option to edit the originating message.

3. A system as defined in claim 2, wherein the authenticator provides to the sender station means for accessing and reading the message record.

4. A system as defined in claim 3, wherein the authenticator provides to the recipient station means for accessing and reading the message record.

5. A system as defined in claim 1, additionally comprising complementary means whereby the authenticator notifies the sender or makes available notice to the sender of (i) the viewing by the recipient of the sender's preceding message; and (ii) a non-response of the recipient to the sender's preceding message.

6. A system as defined in claim 1, wherein the authenticator prior to selection of a response at the recipient station notifies the recipient station of an authenticator-controlled URL at which the sender's message can be accessed and viewed, in order to enable the recipient station to select its response thereto.

7. The system as defined in claim 1, wherein the unique message record is stored in an analog format.

8. The system as defined in claim 1 wherein said authenticator sends a plurality of status messages to said sender at predetermined intervals, each of said messages indicating the status of said series of messages.

9. A method of routing and verifying a sender's message and a recipient's response in an exchange of related identifiable telecommunicated messages exchanged between at least a sender station and a recipient station within a network, thereby to enable provision of an authentic record of the exchanged message, comprising centrally performing the following tasks:
a. receiving an originating message from a sender station;
b. authenticating the identity of said sender station and determining membership of a sender associated with said sender station in an authorized class of parties to said message;
c. authenticating the originating message and recording and storing the originating message in a message record uniquely associated with the exchange;
d. authenticating the identity of the recipient station, and determining membership of a recipient associated with said recipient station in an authorized class of parties to said message, and notifying the recipient station of the originating message and providing to the recipient station access to the contents of the message;
e. receiving, identifying, and recording the recipient's response to the originating message, the response being selected from and limited to a preselected group; the group comprising acceptance, rejection, a request for clarification, and editing the original message;
f. storing the response in the message record;
g. alerting the sender station to the receipt of the response; and
h. communicating to the sender station on demand the content of the response or of selected portions of the response.

10. A method as defined in claim 9, wherein the authenticator provides to the sender station access to the message recorder.

11. A method as defined in claim 10, wherein the authenticator provides the recipient station access to the message record.

12. A method as defined in claim 9, wherein the authenticator prior to selection of a response at the recipient station notifies the recipient station of an authenticator-controlled URL at which the sender's message can be accessed and viewed, in order to enable the recipient station to select its response thereto.

13. A method as defined in claim 9, wherein the authenticator additionally communicates to the sender station an identification of that member of the preselected group in which the recipient station's response has been selected.

14. The method as defined in claim 9, further comprising:
i. sending a plurality of status messages to said sender station at predetermined intervals, each of said status messages indicating the status of said series of messages.

15. A method of verifying a series of messages exchanged between at least a sender station and recipient station of a network thereby to enable provision of an authentic record of an agreement reached and defined by the message exchanged, and storing said series, comprising
a. authenticating the identity of said sender station and determining membership of a sender associated with said sender station in an authorized class of parties to said message;
b. routing, authenticating and storing of at least three related identifiable telecommunicated messages in the series of messages exchanged between the sender station and the recipient station after authenticating the identity of said recipient station and determining membership of a recipient associated with said recipient station in an authorized class of parties to said message;
c. classifying the recipient station's response to an originating message in said series of messages, said response being selected at the recipient station from a group comprising at least (i) acceptance and rejection of the originating message, (ii) a response to a question in the originating message; and (iii) a response to an offer or option included in the originating message;
d. alerting the sender station to the receipt of the recipient's response to the originating message; and
e. creating and storing a unique identifiable analog message record for the originating message and all subsequent messages in the series.

16. A method as defined in claim 15, wherein the group from which said response is selected also includes a request for clarification of the initiating message or clarification of a question or offer or option included in the initiating message.

17. A method as defined in claim 15, additionally comprising a complementary method wherein the authenticator notifies the sender or makes available notice to the sender of (i) the viewing by the recipient of the sender's preceding message; and (ii) a non-response of the recipient to the sender's preceding message.

18. A method as defined in claim 15, wherein the authenticator prior to selection of a response at the recipient station notifies the recipient station of an authenticator-controlled URL at which the sender's message can be accessed and viewed, in order to enable the recipient station to select its response thereto.

19. A method as defined in claim 15, wherein the authenticator additionally communicates to the sender station an identification of that member of the preselected group in which the recipient station's response has been selected.

20. A method as defined in claim 19, wherein the authenticator additionally communicates to the sender station a notification that the complete series of messages has resulted in acceptance, a rejection, or neither acceptance or rejection of contract offer.

* * * * *